US007191022B1

(12) United States Patent
Kakuhari et al.

(10) Patent No.: US 7,191,022 B1
(45) Date of Patent: Mar. 13, 2007

(54) PUBLIC ADDRESSING SYSTEM

(75) Inventors: Isao Kakuhari, Nara (JP); Kenichi Terai, Osaka (JP); Hiroyuki Hashimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/486,864

(22) PCT Filed: Oct. 2, 1998

(86) PCT No.: PCT/JP98/04471

§ 371 (c)(1),
(2), (4) Date: Jun. 8, 2000

(87) PCT Pub. No.: WO99/22549

PCT Pub. Date: May 6, 1999

(30) Foreign Application Priority Data

Oct. 23, 1997 (JP) .................................. 9-291265
Oct. 23, 1997 (JP) .................................. 9-291266

(51) Int. Cl.
*G06F 17/00* (2006.01)
*H04B 1/00* (2006.01)
*H04B 3/00* (2006.01)
*H04R 1/02* (2006.01)

(52) U.S. Cl. ............................ 700/94; 381/86; 381/89; 381/80

(58) Field of Classification Search .................. 700/94; 381/89, 82, 86, 80, 302, 312, 387, 389, 182, 381/186, 77, 78, 79

See application file for complete search history.

(56) References Cited

U.S. PATENT DOCUMENTS 2,203,715 A * 6/1940 Benecke ...................... 381/89
3,271,735 A * 9/1966 Gosswiller .................. 340/473
3,579,184 A * 5/1971 Forestal ...................... 340/470
3,781,475 A * 12/1973 Sharp .......................... 381/62
4,192,216 A * 3/1980 Wait ........................... 89/40.03
4,460,061 A * 7/1984 Dodge ........................ 181/175
4,594,729 A * 6/1986 Weingartner ................. 381/18

(Continued)

FOREIGN PATENT DOCUMENTS

DE 24 55 336 A1 5/1976

(Continued)

OTHER PUBLICATIONS

European Search Report dated Jul. 29, 2005.

*Primary Examiner*—Sinh Tran
*Assistant Examiner*—Devona E. Faulk
(74) *Attorney, Agent, or Firm*—Snell & Wilmer L.L.P.

(57) ABSTRACT

A sound-amplification apparatus comprises: an acoustic signal source for outputting an acoustic signal; an amplified sound source for receiving the acoustic signal from the acoustic signal source and radiating an amplified sound; a control sound source provided in a vicinity of the amplified sound source for radiating a control sound; and signal processing means for producing a control sound signal by controlling at least one of an amplitude and a phase of the acoustic signal from the acoustic signal source so that an acoustic space having a desired directionality is formed by interference between the amplified sound and the control sound, and providing the control sound signal to the control sound source.

10 Claims, 28 Drawing Sheets

U.S. PATENT DOCUMENTS

| | | | | |
|---|---|---|---|---|
| 4,982,436 | A | 1/1991 | Cowan | |
| 5,397,866 | A | 3/1995 | Lyons et al. | |
| 5,870,484 | A * | 2/1999 | Greenberger | 381/300 |
| 5,887,068 | A * | 3/1999 | Givogue et al. | 381/89 |

FOREIGN PATENT DOCUMENTS

| | | | |
|---|---|---|---|
| DE | 3844572 | A1 * | 2/1990 |
| EP | 239914 | A2 * | 10/1987 |
| JP | 52153725 | | 12/1977 |
| JP | 4058698 | | 2/1992 |
| JP | 06072253 | A * | 3/1994 |
| JP | 0721893 | | 8/1995 |
| JP | 08228394 | | 9/1996 |

* cited by examiner

FIG. 7A Output signal from acoustic signal source
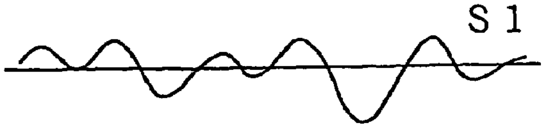
FIG. 7B Output signal from error detector
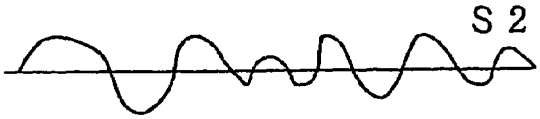
FIG. 7C Output signal 1 from calculation means
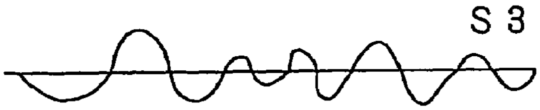
FIG. 7D Output signal 2 from calculation means
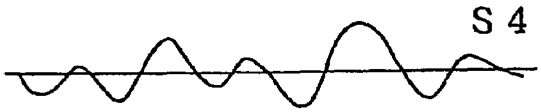
FIG. 7E Output signal 3 from calculation means
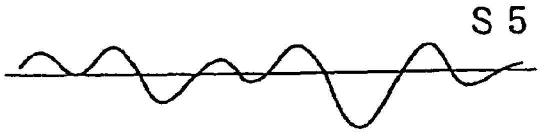

Interval between acoustic radiation planes
:Wavelength of reproduced sound x(1/4)

Interval between acoustic radiation planes
:Wavelength of reproduced sound x(1/2)

Interval between acoustic radiation planes
:Wavelength of reproduced sound x(2/3)

Interval between acoustic radiation planes
:Wavelength of reproduced sound x(8/9)

PUBLIC ADDRESSING SYSTEM

TECHNICAL FIELD

The present invention relates to a sound-amplification apparatus for outputting an amplified sound having an intended directionality using an active directionality control.

BACKGROUND ART

Conventionally, a horn loudspeaker system has been used for increasing the directionality of an amplified sound. Such a conventional sound-amplification apparatus will be described with reference to FIG. 1.

A conventional horn loudspeaker system 20 illustrated in FIG. 1 includes a horn driver 21 and a horn 22 for controlling the acoustic radiation direction and the directionality angle. The horn 22 is an acoustic tube for forwardly radiating an amplified sound by the horn acoustic radiation plane 23. In the figure, i is the diameter of the horn acoustic radiation plane 23, and k is an arrow denoting the direction in which a sound travels through the horn 22.

In order to narrow the directionality angle, it is generally necessary to increase the diameter i of the horn acoustic radiation plane 23. Moreover, in order to reduce the disturbance in the sound pressure frequency characteristic of a sound to be radiated, it is necessary to reduce the frequency change in the acoustic impedance of the horn 22 along the axis thereof. Therefore, in the horn 22 of FIG. 1, the cross section thereof along a direction perpendicular to the sound wave traveling direction k is varied continuously and smoothly. A sound wave reproduced by the horn driver 21 is externally radiated through the horn acoustic radiation plane 23, with its directionality being controlled while it is guided through the horn 22 along the direction of the arrow k.

With the above-described conventional sound-amplification apparatus 20, however, it is necessary to increase the horn acoustic radiation plane 23 in order to obtain a narrow directionality. Moreover, the directional radiation pattern of an amplified sound to be radiated is uniquely determined by the shape of the horn 22. Therefore, it is necessary to replace the horn 22 with another depending upon the required directional radiation pattern.

On the other hand, the reproduction of an acoustic signal should preferably be performed with a desirable S/N ratio even in environmental noise. Therefore, a directional loudspeaker apparatus using an ellipsoidal acoustic reflector has been proposed in the art. Such a conventional example will be described below with reference to figures.

FIG. 2 is a structure diagram illustrating a conventional directional loudspeaker apparatus 30 illustrated in Japanese Laid-Open Publication No. 2-87797.

The directional loudspeaker apparatus 30 includes a concave (parabolic) reflector 31, and a sound source 32 which is provided within the reflector 31 to face a central portion thereof. In this way, a sound output from the sound source 32 is reflected by the reflector 31 so that a sound having a strong directionality along the axis of the reflector 31 is output on the rear side of the sound source 32.

FIG. 3 is a structure diagram illustrating another conventional directional loudspeaker apparatus 40 illustrated in Japanese Laid-Open Publication No. 8-228394.

The directional loudspeaker apparatus 40 includes a concave (hemispherical) reflector 41, and a sound source 42 which is provided within the reflector 41 to face a central portion thereof. The sound source 42 and the reflector 41 are kept at a constant interval, and a rear cover 43 is attached on the rear side of the sound source 42. By covering the rear side of the sound source 42 with the rear cover 43, a rearward sound radiated directly from the sound source 42 is reduced. In this way, the divergent component is reduced, thereby further emphasizing the directional radiation pattern given by the reflected sound from the reflector 41.

In the conventional directional loudspeaker apparatus 30 illustrated in FIG. 2, sound radiation also occurs from the rear side of the sound source 32, whereby the sound is scattered about the sound source 32. Therefore, it is difficult to obtain a narrow directional radiation pattern. In the conventional directional loudspeaker apparatus 40 illustrated in FIG. 3, a rear cover 43 of a sound absorbing material or a sound blocking material is provided in order to reduce the sound radiation from the rear side of the sound source 42. In practice, however, it is difficult to reduce the radiated sound except for very high frequencies.

An on-vehicle sound-amplification apparatus has been one application of such a sound-amplification apparatus. For such a conventional on-vehicle sound-amplification apparatus, a horn loudspeaker system is typically employed in order to efficiently diffuse a reproduced sound to the environment. A conventional on-vehicle sound-amplification apparatus 50 will be described below with reference to FIG. 4.

In FIG. 4, reference numeral 34 denotes a horn driver, 35 a reentrant horn for controlling the acoustic radiation main axis and the directionality angle, 36 a horn acoustic radiation plane, i the diameter of the horn acoustic radiation plane, j the horn length, and k and k' each denote a horn central axis. Generally, the narrower the directionality angle is, the larger the diameter i of the horn acoustic radiation plane 36 is. In order to obtain a desirable sound pressure frequency characteristic, it is necessary to increase the length of each of the horn central axes k and k'. However, the horn driver 34 and the horn acoustic radiation plane 36 are coupled together with the reentrant horn 35, which is obtained by folding back a horn, so as to reduce the horn length j without reducing the length of the horn central axes k and k'.

In the conventional on-vehicle sound-amplification apparatus 50 having such a structure, a sound wave reproduced by the horn driver 34 is externally radiated through the horn acoustic radiation plane 36, with its directionality being controlled while it is guided through the reentrant horn 35 in the directions indicated by the arrows along the horn central axes k and k'.

In the above-described conventional on-vehicle sound-amplification apparatus 50, it is necessary to increase the horn acoustic radiation plane 36 in order to obtain a narrow directionality. In practice, however, it is difficult to increase the horn acoustic radiation plane 36 because it is provided on the outside of the vehicle body. Therefore, it is difficult to avoid the use of a small-diameter horn loudspeaker system, resulting in a wide directional radiation pattern. Therefore, the radiated sound is transferred to the passengers including the driver, thereby hindering them from having a conversation or listening to the radio.

DISCLOSURE OF THE INVENTION

A sound-amplification apparatus according to the present invention includes an acoustic signal source for outputting an acoustic signal: an amplified sound source for receiving the acoustic signal from the acoustic signal source and radiating an amplified sound; a control sound source provided in the vicinity of the amplified sound source for radiating a control sound; and signal processing means for producing a control sound signal by controlling at least one of an amplitude and a phase of the acoustic signal from the acoustic signal source so that an acoustic space having a desired directionality is formed by interference between the amplified sound and the control sound, and providing the control sound signal to the control sound source.

In one embodiment, the signal processing means includes an error detector provided in the vicinity of the control sound source for detecting a synthesized sound between the amplified sound and the control sound; directional radiation pattern selection means for selecting one of an output from the error detector and the acoustic signal from the acoustic signal source so as to obtain a predetermined directional radiation pattern; and calculation means for producing the control sound signal by using the signal selected by the directional radiation pattern selection means, and providing the control sound signal to the control sound source, wherein the calculation means is provided for: when ensuring a directionality such that the amplified sound directed toward the error detector is reduced, producing, as a first control sound signal, a signal obtained by controlling the amplitude and the phase of the acoustic signal from the acoustic signal source so that the output signal from the error detector is 0; when ensuring a dipole directional radiation pattern, producing, as a second control sound signal, a signal obtained by inverting the phase of the acoustic signal from the acoustic signal source; when ensuring a non-directional radiation pattern, producing, as a third control sound signal, a signal having the same phase as that of the acoustic signal from the acoustic signal source; and providing one of the first to third control sound signals to the control sound source as the control sound signal.

The control sound source may be provided along the same axis with the amplified sound source so that an acoustic radiation plane thereof is located symmetrically with an acoustic radiation plane of the amplified sound source.

The error detector may be provided along a straight line which passes through respective centers of the acoustic radiation planes of the amplified sound source and the control sound source.

In one embodiment, the calculation means includes: a filtered-X filter for, where a transfer function of a space extending from the control sound source to the error detector is denoted by C, multiplying the acoustic signal output from the acoustic signal source by the transfer function C: an adaptive filter for performing a convolution calculation on the acoustic signal from the acoustic signal source with a transfer function F, and providing the obtained calculation result to the control sound source as the first control sound signal; and a coefficient updator for receiving an output from the directional radiation pattern selection means as an error signal, receiving an output from the filtered-X filter as a reference signal, updating a coefficient of the adaptive filter so that the error signal is small, and optimizing the transfer function F.

The amplified sound source may include: a horn driver for converting the acoustic signal from the acoustic signal source to an aerial vibration; and a horn-shaped acoustic tube for continuously enlarging a wavefront of the aerial vibration output from the horn driver along a sound wave traveling direction.

The control sound source may include: a horn driver for converting the control sound signal output from the signal processing means to an aerial vibration; and a horn-shaped acoustic tube for continuously enlarging a wavefront of the aerial vibration output from the horn driver along a sound wave traveling direction.

The acoustic tube may include a horn which is folded back at least once. Preferably, the number of times the acoustic tube is folded back is an odd number.

An acoustic radiation plane of the amplification-sound apparatus and an acoustic radiation plane of the control sound source may be placed such that the difference between the phase of the amplified sound and the phase of the control sound in a desired frequency are substantially within the angle of 90° with respect to the main axis direction of acoustic radiation of the amplified sound.

According to another aspect of the present invention, the sound-amplification apparatus includes: a concave reflector; and a sound source provided within the reflector so as to be unidirectional toward a center of the reflector.

In one embodiment, the sound source includes a control sound source for outputting a control sound and an amplified sound source for outputting an amplified sound, and further includes an acoustic signal source for outputting an acoustic signal; signal processing means for producing a control sound signal by controlling at least one of an amplitude and a phase of the acoustic signal from the acoustic signal source so that an acoustic space having a desired directionality is formed by interference between the amplified sound and the control sound, and providing the control sound signal to the control sound source.

In one embodiment, the signal processing means includes: an error detector provided in a radiation space of the control sound from the control sound source for detecting a synthesized sound between the amplified sound and the control sound; a filtered-X filter for, where a transfer function of an acoustic space extending from the control sound source to the error detector is denoted by C, multiplying the acoustic signal output from the acoustic signal source by the transfer function C; an adaptive filter for performing a convolution calculation on the acoustic signal from the acoustic signal source with a transfer function F, and providing the calculation result to the control sound source as the control sound signal; and a coefficient updator for receiving an output from the error detector as an error signal, receiving an output from the filtered-X filter as a reference signal, updating a coefficient of the adaptive filter so that the error signal is small, and optimizing the transfer function F.

The sound-amplification apparatus further may include signal correction means for performing at least one of a delay control, an amplitude control and a phase control on the acoustic signal output from the acoustic signal source, and providing a resultant signal to the amplified sound source. In such a case, the signal processing means may include: an error detector provided in a radiation space of the control sound from the control sound source for detecting a synthesized sound between the amplified sound and the control sound; a filtered-X filter for, where a transfer function of an acoustic space extending from the control sound source to the error detector is denoted by C, multiplying the acoustic signal output from the acoustic signal source by the transfer function C; an adaptive filter for performing a convolution calculation on the acoustic signal from the acoustic signal source with a transfer function F, and providing the calculation result to the control sound source as the control sound signal; and a coefficient updator for receiving an output from the error detector as an error signal, receiving an output from the filtered-X filter as a reference signal, updating a coefficient of the adaptive filter so that the error signal is small, and optimizing the transfer function F, wherein: where the delay control may be performed, the signal correction means performs the delay control with a delay time which corresponds to an amount of time required for the control sound radiated from the control sound source to reach the error detector. The transfer function F of the adaptive filter may be expressed as −G/C, where G denotes an acoustic transfer function from the amplified sound source to the error detector.

The control sound source may be provided along a same axis with the amplified sound source so that an acoustic radiation plane thereof is located symmetrically with an acoustic radiation plane of the amplified sound source.

The error detector may be provided along a straight line which passes through respective centers of the acoustic radiation planes of the amplified sound source and the control sound source.

An acoustic radiation plane of the amplification-sound source and an acoustic radiation plane of the control sound source may be placed such that the difference between the phase of the amplified sound and the phase of the control sound in a desired frequency are substantially within the angle of 90° with respect to the main axis direction of acoustic radiation of the amplified sound.

According to still another aspect of the present invention, an on-vehicle sound-amplification apparatus includes: a dipole sound source provided in the vicinity of a position of a passenger wherein at least one acoustic radiation axis thereof is directed outwardly from a vehicle interior; and signal processing means for amplifying an acoustic signal and then inputting an output thereof to the dipole sound source.

In one embodiment, the on-vehicle sound-amplification apparatus further includes: a non-directional sound source provided in the vicinity of a center of the dipole sound source wherein an acoustic radiation thereof is driven to have an inverted phase from that of the acoustic radiation of the dipole sound source which is directed into the vehicle interior, wherein the output from the signal processing means is also input to the non-directional sound source.

In one embodiment, the dipole sound source includes at least two loudspeakers wherein the at least two loudspeakers are arranged so that respective acoustic radiation planes thereof are directed opposite to each other; and the signal processing means variably controls the phase of an input to at least one of the loudspeakers included in the dipole sound source.

For example, each of the at least two loudspeakers included in the dipole sound source has an acoustic tube whose cross-sectional area along a direction perpendicular to a sound wave traveling direction varies continuously; the acoustic tubes of the respective loudspeakers are arranged so that respective acoustic radiation planes thereof are directed opposite to each other; and a radiated sound from the loudspeaker which is driven by an output from the signal processing means is radiated by being guided along the acoustic tube.

In one embodiment, the signal processing means includes: a radiation sound detector provided in the vicinity of a first one of the at least two loudspeakers included in the dipole sound source; an error detector provided in the vicinity of a second one of the loudspeakers included in the dipole sound source; an adder for adding together respective outputs from the radiated sound detector and the error detector; and calculation means for receiving the acoustic signal and the output from the adder, performing a calculation so that the output from the adder is small, and inputting the obtained result to the second loudspeaker located in the vicinity of the error detector, wherein the acoustic signal is input to the first loudspeaker located in the vicinity of the radiated sound detector.

In such a case, for example, the calculation means includes: an adaptive filter for receiving the acoustic signal; a filter for receiving the acoustic signal; and a coefficient updator for receiving the output from the adder and an output from the filter, wherein: an output from the adaptive filter is input to the second loudspeaker located in the vicinity of the error detector; the coefficient updator updates a coefficient of the adaptive filter by performing a calculation so that the output from the adder is small, and the filter has a characteristic equal to a transfer function from the error detector to the second loudspeaker located in the vicinity of the error detector.

In another embodiment, the signal processing means includes: a radiated sound detector arranged in the vicinity of a first one of the at least two loudspeakers included in the dipole sound source; a first error detector arranged in the vicinity of a second one of the loudspeakers included in the dipole sound source; a second error detector arranged in the vicinity of the non-directional sound source; signal correction means for receiving an output from the second error detector; a first adder for adding together an output from the radiation sound detector and an output from the first error detector; a second adder for adding together the output from the first error detector and an output from the signal correction means; first calculation means for receiving the acoustic signal and an output signal from the first adder, and performing a calculation so that the output signal from the first adder is small, wherein an output therefrom is input to the second loudspeaker located in the vicinity of the first error detector; and second calculation means for receiving the acoustic signal and an output signal from the second adder, and performing a calculation so that the output signal from the second adder is small, wherein an output therefrom is input to the non-directional sound source, wherein the acoustic signal is input to the first loudspeaker located in the vicinity of the radiation sound detector.

In such a case, for example, the first calculation means includes: a first adaptive filter for receiving the acoustic signal; a first filter for receiving the acoustic signal; and a first coefficient updator for receiving the output from the first adder and an output from the first filter, wherein: an output from the first adaptive filter is input to the second loudspeaker located in the vicinity of the first error detector; the first coefficient updator updates a coefficient of the first adaptive filter by performing a calculation so that the output from the first adder is small; and the first filter has a characteristic equal to a transfer function from the first error detector to the second loudspeaker located in the vicinity of the first error detector, the second calculation means includes: a second adaptive filter for receiving the acoustic signal; a second filter for receiving the acoustic signal; and a second coefficient updator for receiving the output from the second adder and an output from the second filter, wherein: an output from the second adaptive filter is input to the non-directional sound source; the second coefficient updator updates a coefficient of the second adaptive filter by performing a calculation so that the output from the second adder is small; and the second filter has a characteristic equal to a transfer function from the second error detector to the non-directional sound source.

The acoustic tube of each of the at least two loudspeakers included in the dipole sound source may be formed of a sound path having a desired bent shape.

Preferably, the at least two loudspeakers included in the dipole sound source are arranged so that an interval between the respective acoustic radiation planes included in the acoustic tubes of the loudspeakers is less than or equal to approximately ½ of the wavelength of the reproduced sound.

The dipole sound source may include an amplified sound source for radiating an amplified sound and a control sound source for radiating a control sound, wherein an acoustic radiation plane of the amplified sound source and an acoustic radiation plane of the control sound source may be placed such that the difference between the phase of the amplified sound and the phase of the control sound in a desired frequency are substantially within the angle of 90° with respect to the main axis direction of acoustic radiation of the amplified sound.

Therefore, the present invention has objectives of: (1) providing a sound-amplification realizing a plurality of directionalities from a narrow directional radiation pattern to a wide directional radiation pattern by signal processing without having to extensively change the structure of the loudspeaker system; (2) providing a directional loudspeaker apparatus as an amplification-sound apparatus implementing a sharp directional radiation pattern with a reflector by reducing a radiated sound from the back of the sound source; and (3) providing an on-vehicle amplification-sound apparatus in which a narrow directional radiation pattern is realized using any of amplification-sound apparatuses described above without making the size greater and a radiated sound transmitted to a driver and passengers is reduced.

These and other advantages of the present invention will become apparent to those skilled in the art upon reading and understanding the following detailed description with reference to the accompanying figures.

BRIEF DESCRIPTION OF THE DRAWINGS

FIGS. 7A through 7E are signal waveform diagrams illustrating an operation of the amplification-sound apparatus shown in FIG. 6.

BEST MODE FOR CARRYING OUT THE INVENTION

Hereinafter, the present invention will be described with reference to the accompanying drawings by way of examples illustrated therein.

Embodiment 1

Figure 1:
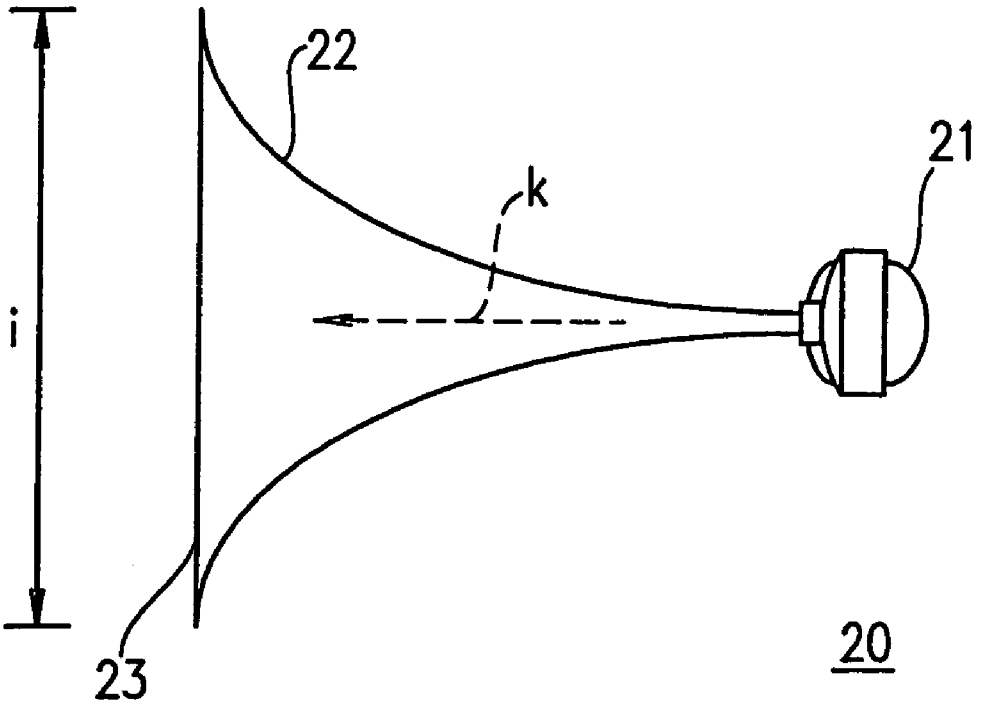
FIG. 1 is a diagram schematically illustrating a conventional amplification-sound apparatus.
Figure 2:
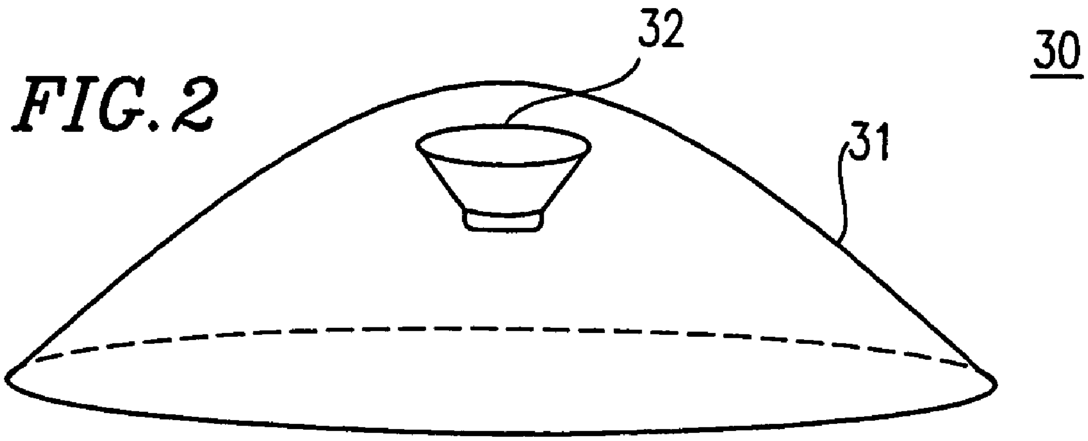
FIG. 2 is a diagram schematically illustrating a structure of a conventional directional loudspeaker apparatus.
Figure 3:
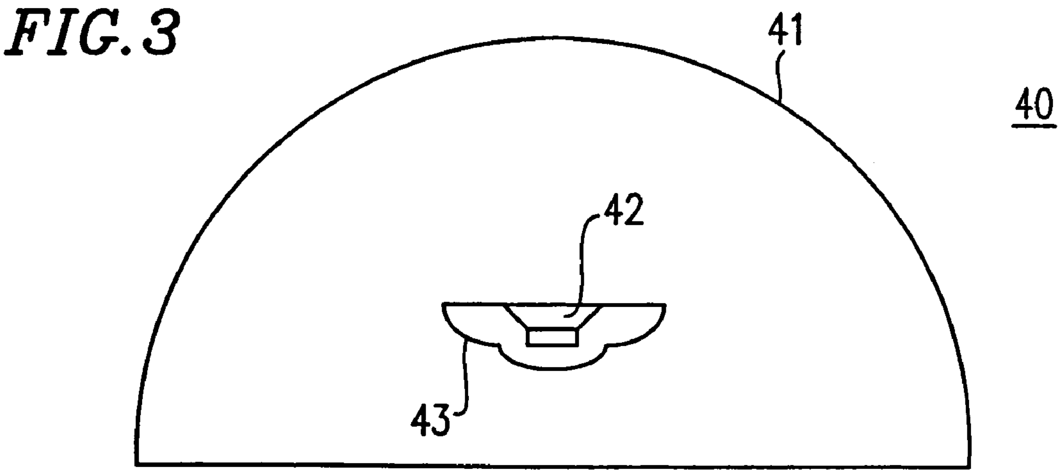
FIG. 3 is a diagram schematically illustrating a structure of another conventional directional loudspeaker apparatus.
Figure 4:
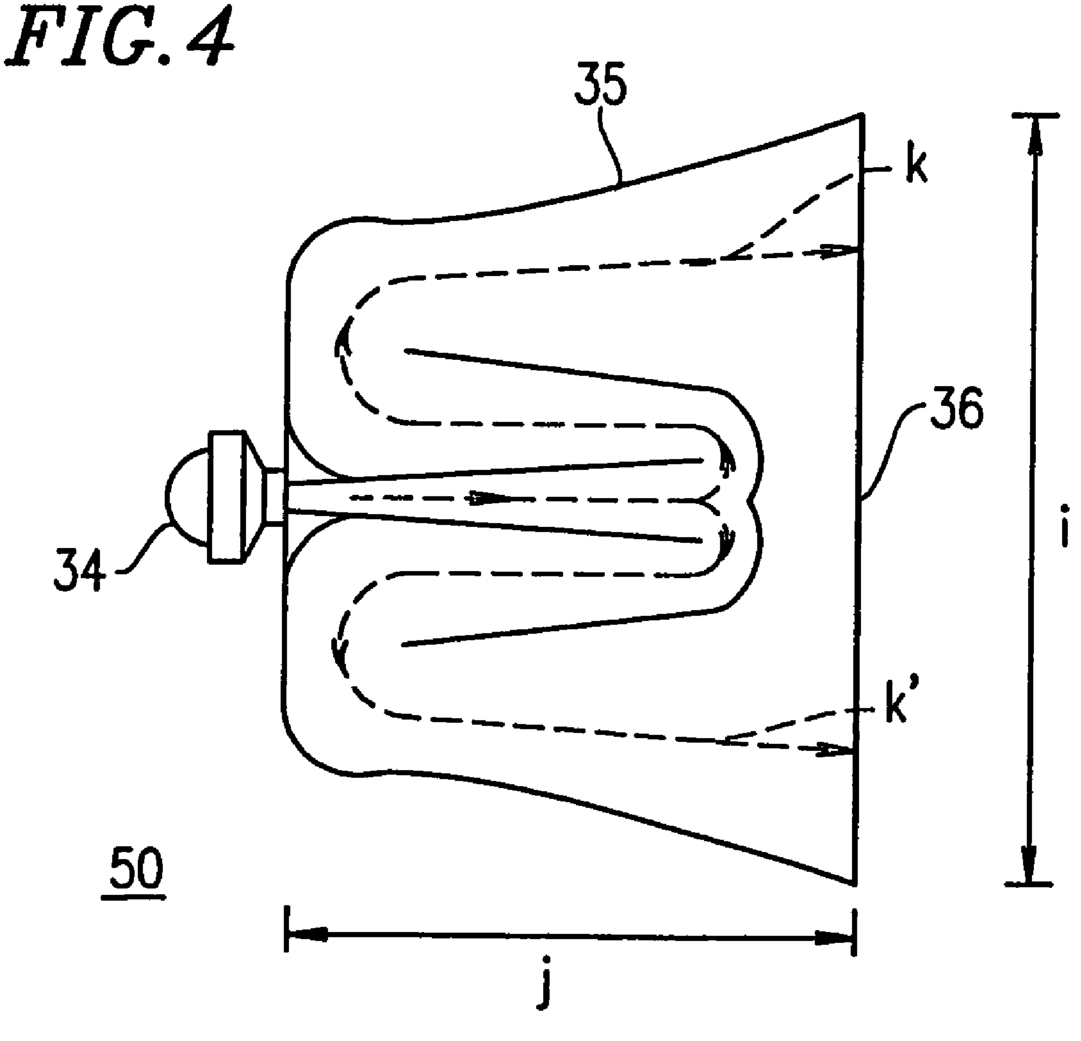
FIG. 4 is a vertical-sectional view schematically illustrating a conventional on-vehicle sound-amplification apparatus.
Figure 5:
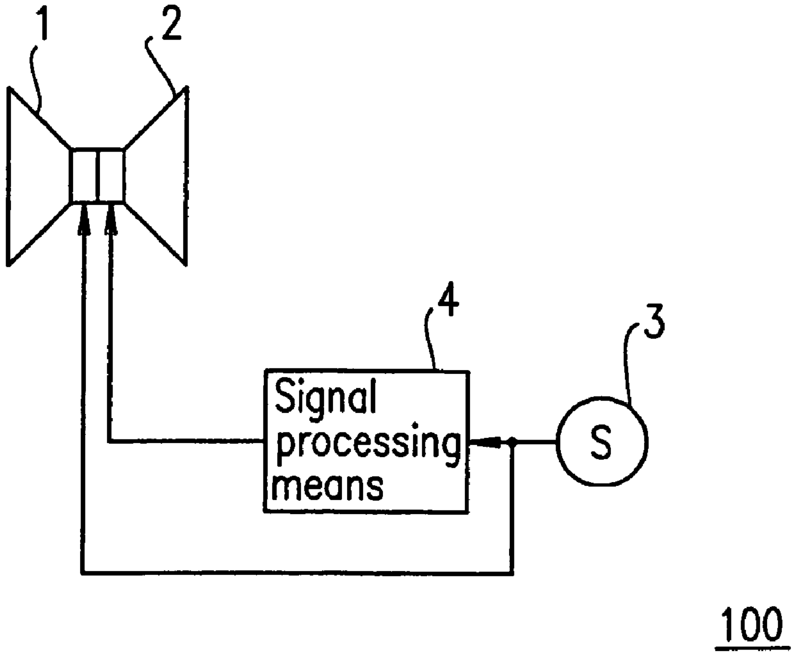
FIG. 5 is a diagram schematically illustrating a structure of a sound-amplification apparatus of Embodiment 1 of the present invention.

A sound-amplification apparatus according to Embodiment 1 of the present invention will be described with reference to the figures. FIG. 5 is a diagram schematically illustrating the structure of a sound-amplification apparatus 100 of the present embodiment. The sound-amplification apparatus 100 includes an amplified sound source 1, a control sound source 2, an acoustic signal source 3 and signal processing means 4.

The amplified sound source 1 converts an acoustic signal from the acoustic signal source 3 to an amplified sound and radiates the amplified, sound. On the other hand, the control sound source 2 converts a control sound signal from the signal processing means 4 to a control sound and radiates the control sound. The amplified sound source 1 and the control sound source 2 are provided in the opposite directions with respect to each other. The sound sources 1 and 2 do not have to be arranged along the same axis as illustrated in the figure. The signal processing means 4 produces a control sound signal by performing a signal processing operation on the acoustic signal from the acoustic signal source 3 with respect to the amplitude or the phase thereof.

With the sound-amplification apparatus 100 having such a structure, interference occurs between the amplified sound from the amplified sound source 1 and the control sound from the control sound source 2. Therefore, it is possible to change the directional radiation pattern of the amplified sound source 1 by the control sound from the control sound source 2. Thus, it is possible to realize various directional radiation patterns based on the characteristic setting of the signal processing means 4 without requiring a change in the structure of the loudspeaker system which is the amplified sound source 1.

Embodiment 2

Next, a sound-amplification apparatus according to Embodiment 2 of the present invention will be described with reference to the figures.

Figure 6:
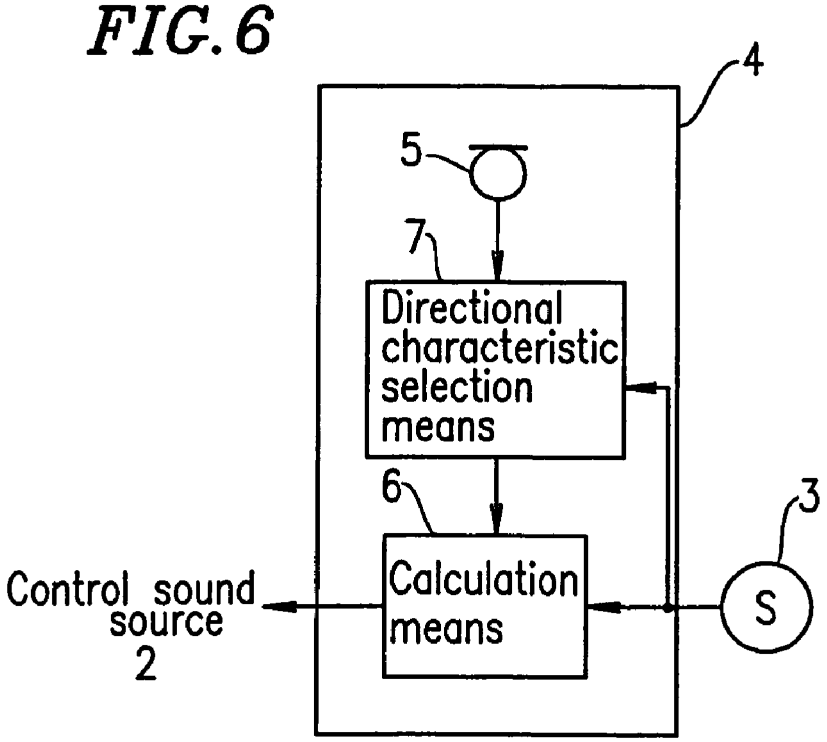
FIG. 6 is a block diagram illustrating signal processing means which is used in the sound-amplification apparatus of Embodiment 2 of the present invention.

FIG. 6 is a diagram illustrating an internal structure of the signal processing means 4 which is used in the sound-amplification apparatus of the present embodiment. The other elements of the present embodiment are substantially the same as those of the sound-amplification apparatus 100 illustrated in FIG. 5, and thus will not be further described. FIGS. 7A to 7E are waveform diagrams illustrating exemplary signals related to the amplified sound source and the control sound source.

As illustrated in FIG. 6, the signal processing means 4 includes an error detector 5, calculation means 6 and directional radiation pattern selection means 7. A portion of the amplified sound from the amplified sound source 1 that is radiated toward the error detector 5 is detected and converted by the error detector 5 to an error signal. The error signal output from the error detector 5 is input to the directional radiation pattern selection means 7.

The directional radiation pattern selection means 7 selects a signal to be provided to the calculation means 6 according to the desired directional radiation pattern. Specifically, the directional radiation pattern selection means 7 selects one of an output from the acoustic signal source 3 (an exemplary waveform thereof is shown in FIG. 7A) and an output from the error detector 5 (an exemplary waveform thereof is shown in FIG. 7B). The calculation means 6 performs three different signal processing operations on the acoustic signal S1 (see FIG. 7A) from the acoustic signal source 3 based on the output signal from the directional radiation pattern selection means 7, thereby producing control sound signals as illustrated in FIGS. 7C to 7E, respectively. In particular, assuming that the output signal from the error detector 5 where there is no control sound output is S2 (see FIG. 7B), the calculation means 6 outputs to the control sound source 2 one of:

(1) a control sound signal S3 (see FIG. 7C) having substantially the same amplitude and inverted phase from those of the signal S2;

(2) a control sound signal S4 (see FIG. 7D) having substantially the same amplitude and inverted phase characteristic from those of the acoustic signal source S1; and (3) a control sound signal S5 (see FIG. 7E) having substantially the same amplitude and same phase characteristic as those of the acoustic signal source S1.

Where the calculation means 6 outputs the control sound signal S3, the amplified sound at the position of the error detector 5 is canceled by a control sound output from the control sound source 2. Therefore, the amplified sound has a unidirectional radiation pattern with the least sound pressure being radiated toward the error detector 5.

Where the calculation means 6 outputs the control sound signal S4, the control sound radiated from the control sound source 2 and the amplified sound radiated from the amplified sound source 1 have substantially the same amplitude and inverted phases from each other. Therefore, the amplified sound in this case is bidirectional where the acoustic radiation has its main axes directed forwardly from the amplified sound source 1 and the control sound source 2, respectively, with the least sound pressure occurring in a direction perpendicular to the main axes of the acoustic radiation. Thus, a dipole directional radiation pattern is realized.

Where the calculation means 6 outputs the control sound signal S5, the control sound radiated from the control sound source 2 and the amplified sound radiated from the amplified sound source 1 have substantially the same amplitude and same phase as each other. The acoustic radiation in this case is such that the amplified sound is omni-directionally and uniformly radiated about the center of gravity between the amplified sound source 1 and the control sound source 2 which are considered as a pair of sound sources. Thus, a non-directional radiation pattern is realized.

As described above, the control sound signal which is output from the calculation means 6 to the control sound source 2 is changed based on the output from the directional radiation pattern selection means 7, thereby changing the directional radiation pattern of the amplified sound. The selection among the directional radiation patterns is performed by the directional radiation pattern selection means 7. Thus, it is possible to realize various directional radiation patterns without requiring a change in the structure of the loudspeaker system.

In the present embodiment, the calculation means 6 is illustrated to function: to produce the control sound signal S3 having an amplitude and phase characteristic for controlling the output signal S2 from the error detector 5 to be 0; to produce the control sound signal S4 having substantially the same amplitude and inverted phase characteristic from those of the output S1 from the acoustic signal source 3; or to produce the control sound signal S5 having substantially the same amplitude and same phase characteristic as those of the output S1 from the acoustic signal source 3. However, the calculation means 6 may alternatively produce a control sound signal which provides any amplitude and/or phase other than those described above based on the output from the directional radiation pattern selection means 7, thereby realizing any other directional radiation pattern.

Embodiment 3

Next, a sound-amplification apparatus according to Embodiment 3 of the present invention will be described with reference to the figures.

Figure 8:
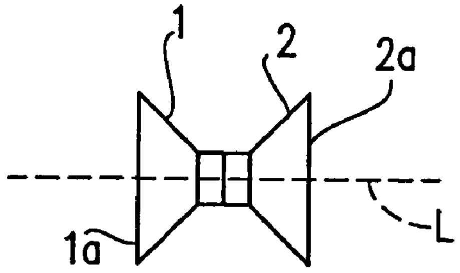
FIG. 8 is a diagram schematically illustrating a part of a structure of an amplification-sound apparatus of Embodiment 3 of the present invention.

FIG. 8 is a diagram illustrating the positional relationship between the amplified sound source 1 and the control sound source 2 used in the sound-amplification apparatus of the present embodiment. The other elements of the present embodiment are substantially the same as those of the sound-amplification apparatus 100 illustrated in FIG. 5, and thus will not be further described.

In the sound-amplification apparatus of the present embodiment, the amplified sound source 1 and the control sound source 2 are provided along the same axis in the opposite directions with respect to each other so that an acoustic radiation plane 1*a* of the amplified sound source 1 and an acoustic radiation plane 2*a* of the control sound source 2 are symmetrically arranged. With such an arrangement, the acoustic space will be axially symmetric with respect to a straight line L which passes through the center of the acoustic radiation plane 1*a* and the center of the acoustic radiation plane 2*a*. Therefore, the directional radiation pattern which results from the interference between the amplified sound from the amplified sound source 1 and the control sound from the control sound source 2 will also be axially symmetric with respect to the straight line L. This facilitates the positioning of the sound-amplification apparatus.

Embodiment 4

A sound-amplification apparatus according to Embodiment 4 of the present invention will be described with reference to the figures.

Figure 9:
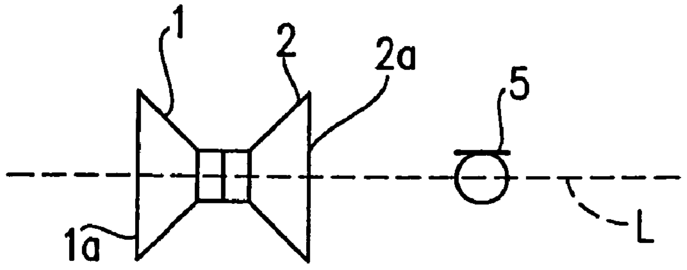
FIG. 9 is a diagram schematically illustrating a part of a structure of an amplification-sound apparatus of Embodiment 4 of the present invention.

FIG. 9 is a diagram illustrating the positional relationship among the amplified sound source 1, the control sound source 2 and the error detector 5 used in the sound-amplification apparatus of the present embodiment. The other elements of the present embodiment are substantially the same as those of the sound-amplification apparatus 100 illustrated in FIG. 5, and thus will not be further described.

Figure 10:
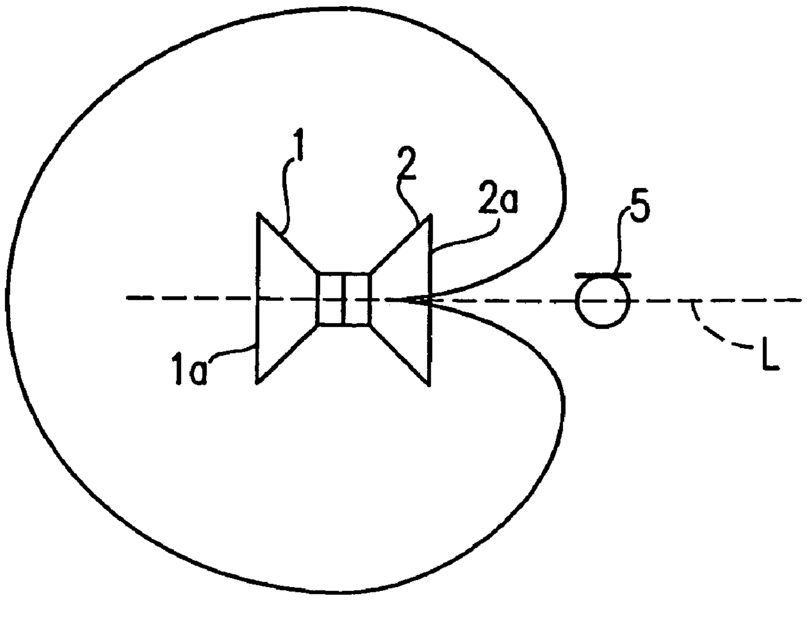
FIG. 10 is a diagram illustrating a directional radiation pattern of the amplification-sound apparatus shown in FIG. 9.

FIG. 10 shows an exemplary directional radiation pattern obtained by the sound-amplification apparatus of the present embodiment.

As illustrated in FIG. 9, the error detector 5 is a non-directional microphone which is provided in the vicinity of the control sound source 2 and along the straight line L which passes through the center of the acoustic radiation plane 1*a* and the center of the acoustic radiation plane 2*a*. With such an arrangement, the amplified sound source 1, the control sound source 2 and the error detector 5 are aligned along the same straight line L. Therefore, when the amplified sound from the amplified sound source 1 is interfered with, and canceled out by, the control sound from the control sound source 2 at the position of the error detector 5 (i.e., when the output from the error detector 5 is controlled to be 0), the obtained directional radiation pattern will be axially symmetric with respect to the straight line L. This facilitates the positioning of the sound-amplification apparatus.

A directional radiation pattern which is obtained when the output from the error detector 5 is controlled to be 0 has been described above in the present embodiment. However, it is possible to obtain through a similar signal processing operation any other directional radiation pattern by controlling the output from the error detector 5 to be any value other than 0. It is understood that the acoustic space resulting in such a case will also be axially symmetric with respect to the straight line L which passes through the center of the acoustic radiation plane 1*a* and the center of the acoustic radiation plane 2*a*.

In the present embodiment, a non-directional microphone is used as the error detector 5. However, it is understood that substantially the same effects can be obtained even with any other detector, e.g., a directional microphone or a vibrometer, capable of detecting the amplified sound at the position where the error detector 5 is provided.

Embodiment 5

A sound-amplification apparatus according to Embodiment 5 of the present invention will be described with reference to the figures.

Figure 11:
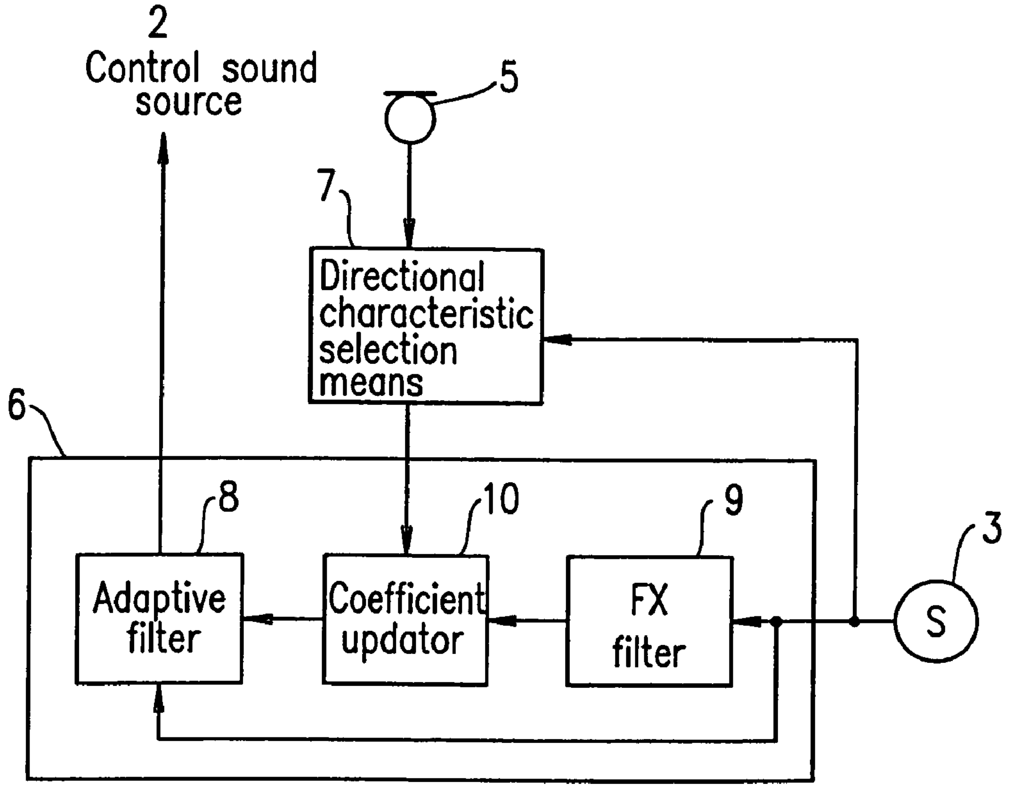
FIG. 11 is a block diagram illustrating calculation means which is used in the sound-amplification apparatus of Embodiment 5 of the present invention.

FIG. 11 is a diagram schematically illustrating the sound-amplification apparatus of the present embodiment, and more particularly the calculation means 6, other elements in the vicinity of the calculation means 6, and the flow of a control signal therethrough. The other elements may be substantially the same as those of any of the sound-amplification apparatuses illustrated in the foregoing embodiments, and thus will not be further described.

As illustrated in FIG. 11, the calculation means 6 in the sound-amplification apparatus of the present embodiment includes an adaptive filter 8, a filtered-X filter (FX filter) 9, and a coefficient updator 10. The FX filter 9 is a filter which is set to a characteristic equal to the transfer function from the control sound source 2 to the error detector 5.

When an output from the error detector 5 is input to the directional radiation pattern selection means 7, the directional radiation pattern selection means 7 outputs to the coefficient updator 10 an output signal (an error signal) whose amplitude and phase characteristics have been adjusted based on a signal from the error detector 5 and an acoustic signal from the acoustic signal source 3. On the other hand, the output from the acoustic signal source 3 is input to the adaptive filter 8 and the FX filter 9. The output from the FX filter 9 is input to the coefficient updator 10 as a reference signal. The coefficient updator 10 uses an LMS (Least Mean Square) algorithm, the like, to update the coefficient of the adaptive filter 8 by performing a coefficient update calculation such that the error signal is always small. The output signal from the adaptive filter 8 is provided to the control sound source 2.

Assuming that the transfer function from the amplified sound source 1 to the error detector 5 is G and the transfer function from the control sound source 2 to the error detector 5 is C, then, the characteristic of the FX filter 9 is set to C. When the coefficient updator 10 is operated to cause the adaptive filter 8 to converge while setting the output signal from the directional radiation pattern selection means 7 to be equal to the output signal from the error detector 5, the output signal from the directional radiation pattern selection means 7 approaches 0, and the adaptive filter 8 converges to a characteristic of −G/C. Thus, for an acoustic signal s, a radiated sound from the amplified sound source 1 as it is received at the error detector 5 (an amplified sound) is represented as:

$$s \cdot G.$$

On the other hand, the control sound from the control sound source 2 as it is received at the error detector 5 is represented as:

$$s \cdot (-G/C) \cdot C = -s \cdot G.$$

The amplified sound and the control sound interfere with each other at the position of the error detector 5. Thus, $$s \cdot G + (-s \cdot G) = 0.$$

Therefore, at the position of the error detector 5, the amplified sound is canceled out by the control sound so that the amplified sound has a directional radiation pattern with the least acoustic radiation occurring at the position of the error detector 5.

When the coefficient updator 10 is operated to cause the adaptive filter 8 to converge while setting the output signal from the directional radiation pattern selection means 7 to s·C, the adaptive filter 8 converges to a characteristic of −1. Thus, for an acoustic signal s, a radiated control sound from the control sound source 2 is represented as:

$$-1 \cdot s = -s.$$

Therefore, the amplified sound and the control sound will have the same amplitude and inverted phases from each other. In such a case, due to the interference therebetween, a dipole directional radiation pattern is obtained.

When the coefficient updator 10 is operated to cause the adaptive filter 8 to converge while setting the output signal from the directional radiation pattern selection means 7 to −s·C, the adaptive filter 8 converges to a characteristic of 1. Thus, for an acoustic signal s, a radiated sound from the control sound source 2 is represented as:

$$1 \cdot s = s.$$

Therefore, the amplified, sound and the control sound will have the same amplitude and same phase as each other. In such a case, due to the interference therebetween, a non-directional radiation pattern is obtained.

The present embodiment illustrates three different cases, where the directional radiation pattern selection means 7 respectively outputs: a signal having substantially the same amplitude and same phase characteristic as those of the error detector 5; a signal having a characteristic which is obtained by convoluting a signal having substantially the same amplitude and same phase characteristic as those of the output from the acoustic signal source 3 with a transfer function from the control sound source 2 to the error detector 5; and a signal having a characteristic which is obtained by convoluting a signal having substantially the same amplitude and inverted phase characteristic from those of the output from the acoustic signal source 3 with a transfer function from the control sound source 2 to the error detector 5. Other than these cases, the directional radiation pattern selection means 7 can alternatively switch among different directional radiation patterns so as to control the amplitude and/or the phase of the output signal to an intended value.

On the other hand, the control signal output from the adaptive filter 8 to the control sound source 2 is changed according to the output from the directional radiation pattern selection means 7. Thus, the present sound-amplification apparatus can form any directional radiation pattern other than those described above.

Embodiment 6

Next, a sound-amplification apparatus according to Embodiment 6 of the present invention will be described with reference to the figures.

Figure 12:
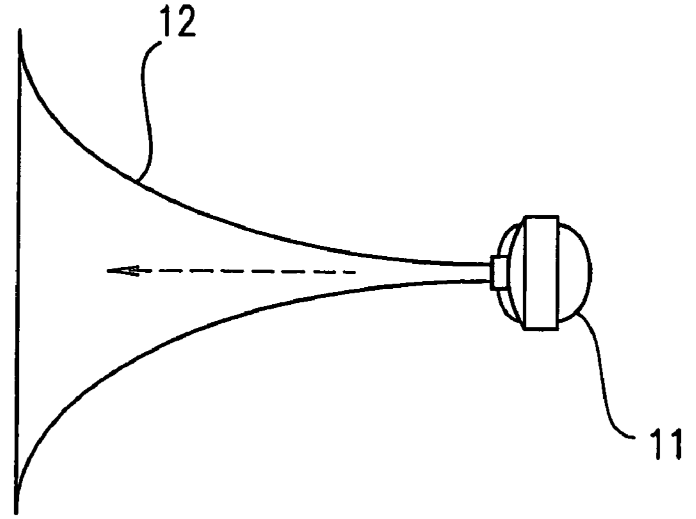
FIG. 12 is a diagram schematically illustrating a part of a structure of an amplification-sound apparatus of Embodiment 6 of the present invention.

In the sound-amplification apparatus of the present embodiment, a horn loudspeaker system as illustrated in FIG. 12 is employed as the loudspeaker system for one or both of the amplified sound source 1 and the control sound source 2. The other elements may be substantially the same as those of any of the sound-amplification apparatuses illustrated in the foregoing embodiments, and thus will not be further described.

Referring to FIG. 12, the horn loudspeaker system includes a horn driver 11 and an acoustic tube 12. The acoustic tube 12 has a continuously varied cross-sectional area along a plane perpendicular to the sound wave traveling direction (the direction indicated by an arrow in the figure). Therefore, the frequency change in the acoustic impedance of the acoustic tube 12 along the axis thereof is reduced, thereby preventing the disturbance in the frequency characteristic of the acoustic radiation from the acoustic tube 12. Thus, it is possible to obtain a desirable directional radiation pattern and a desirable acoustic characteristic.

Embodiment 7

Next, a sound-amplification apparatus according to Embodiment 7 of the present invention will be described with reference to the figures.

Figure 13:
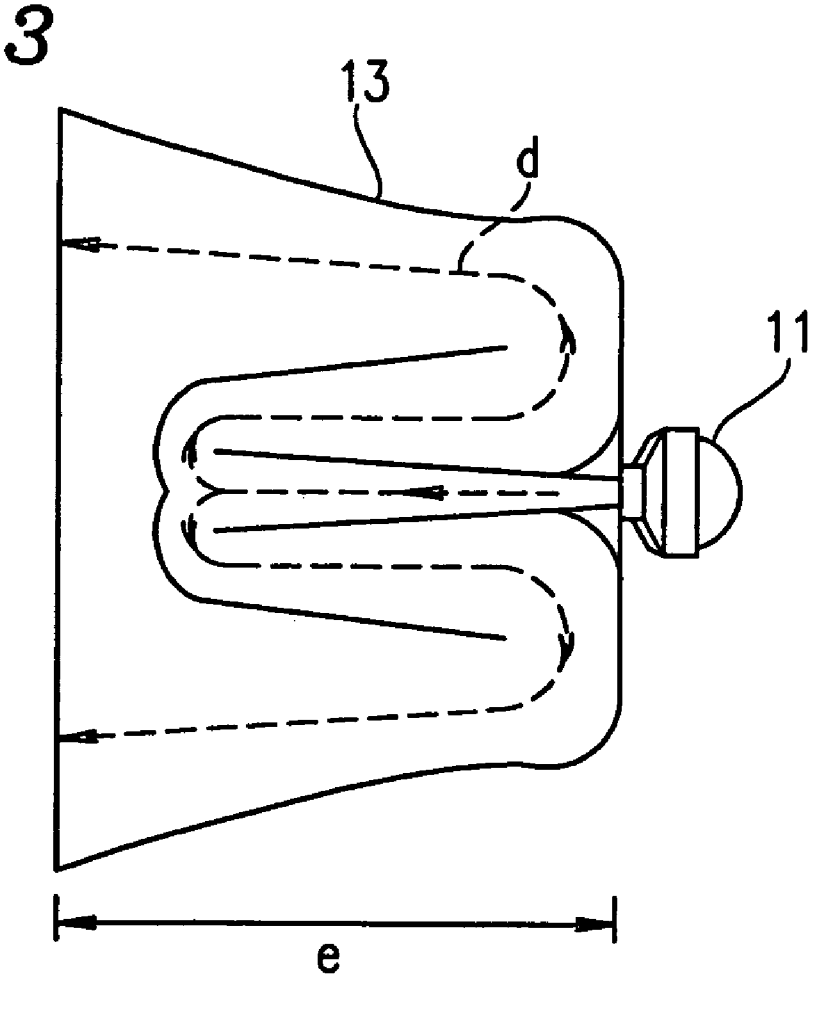
FIG. 13 is a diagram schematically illustrating a part of a structure of an amplification-sound apparatus of Embodiment 7 of the present invention.

In the sound-amplification apparatus of the present embodiment, the horn loudspeaker system employed for one or both of the amplified sound source 1 and the control sound source 2 has a reentrant horn as illustrated in FIG. 13. The other elements may be substantially the same as those of any of the sound-amplification apparatuses illustrated in the foregoing embodiments, and thus will not be further described.

The horn loudspeaker system includes a horn driver 11 and a reentrant horn 13. Herein, d is the central axis of the reentrant horn 13, and e is the horn length of the reentrant horn 13. A sound is radiated from the horn driver 11 to the outside, with its directional radiation pattern being controlled while it is guided through the reentrant horn 13 in the direction indicated by the arrow along the horn central axis d.

With such a structure, it is possible to smoothly vary the cross-sectional area along a direction perpendicular to the sound wave traveling direction through the reentrant horn 13 without having to increase the horn length e. Therefore, the frequency change in the acoustic impedance of the reentrant horn 13 is reduced, whereby the acoustic radiation from the reentrant horn 13 has a reduced disturbance in its sound pressure frequency characteristic. Thus, a desirable directional radiation pattern and a desirable acoustic characteristic can be obtained even with a reduced size. Moreover, by folding back the horn, it is possible to prevent wind and rain from entering the horn driver 11.

FIG. 13 illustrates a case where the horn is folded back twice. However, it is understood that substantially the same effects can be obtained with any other number of times the horn is folded back.

Figure 14:
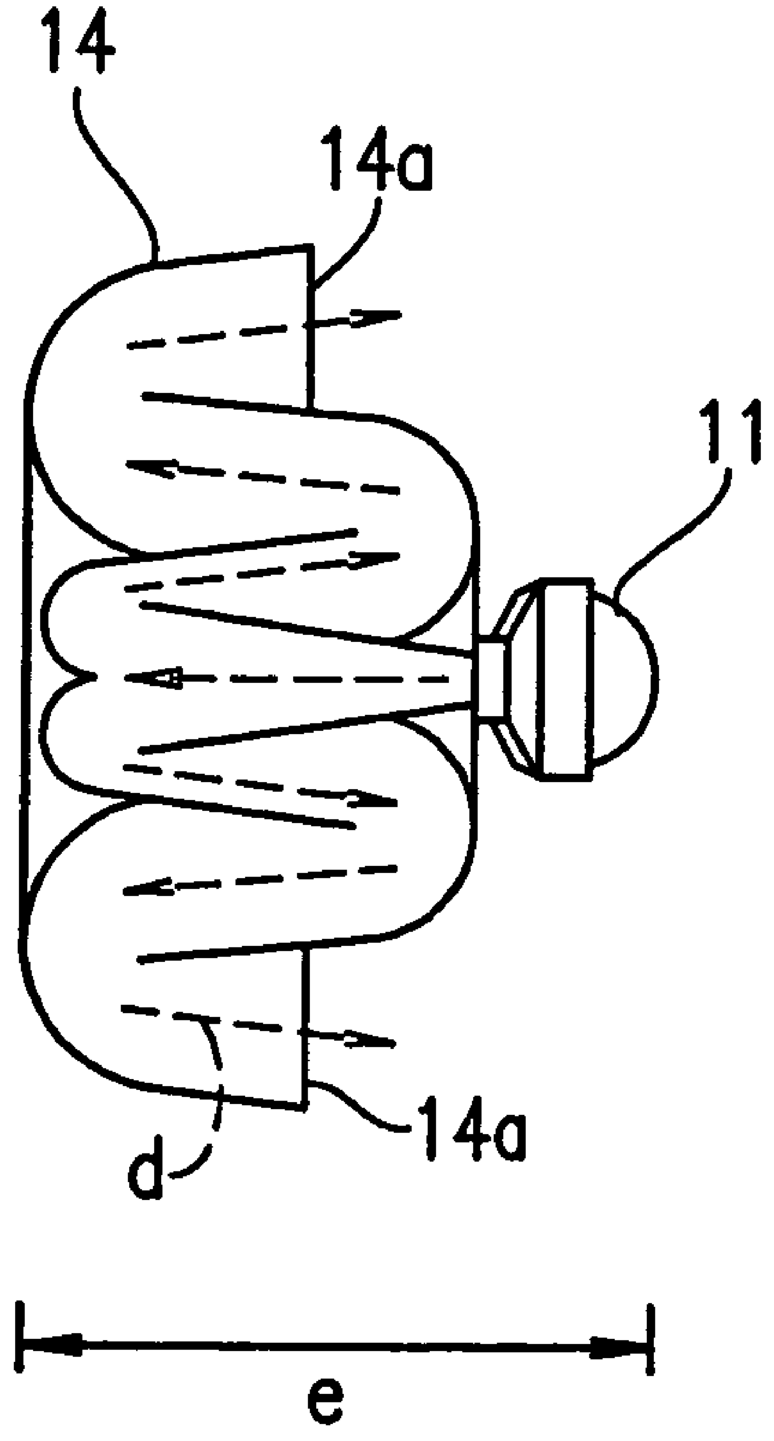
FIG. 14 is a diagram schematically illustrating a part of another structure of an amplification-sound apparatus of Embodiment 7 of the present invention.

For example, the horn loudspeaker system shown in FIG. 14 includes a reentrant horn 14 which is folded back three times, and a horn driver 11. The reentrant horn 14 has acoustic radiation plane 14*a* of its open end, and the plane is in a direction opposite to the output direction of the horn driver 11. A sound is radiated from the horn driver 11 to the outside, with its directional radiation pattern being controlled while it is guided through the reentrant horn 14 in the direction indicated by the arrow along the horn central axis d.

With such a structure, it is possible to smoothly vary the cross-sectional area along a direction perpendicular to the sound wave traveling direction through the reentrant horn 14 without having to increase the horn length e. Therefore, the reentrant horn 14 also has a reduced frequency change in the acoustic impedance, whereby the acoustic radiation from the reentrant horn 14 has a reduced disturbance in its sound pressure frequency characteristic. Thus, a desirable directional radiation pattern and a desirable acoustic characteristic can be obtained even with a reduced size.

Figure 15:
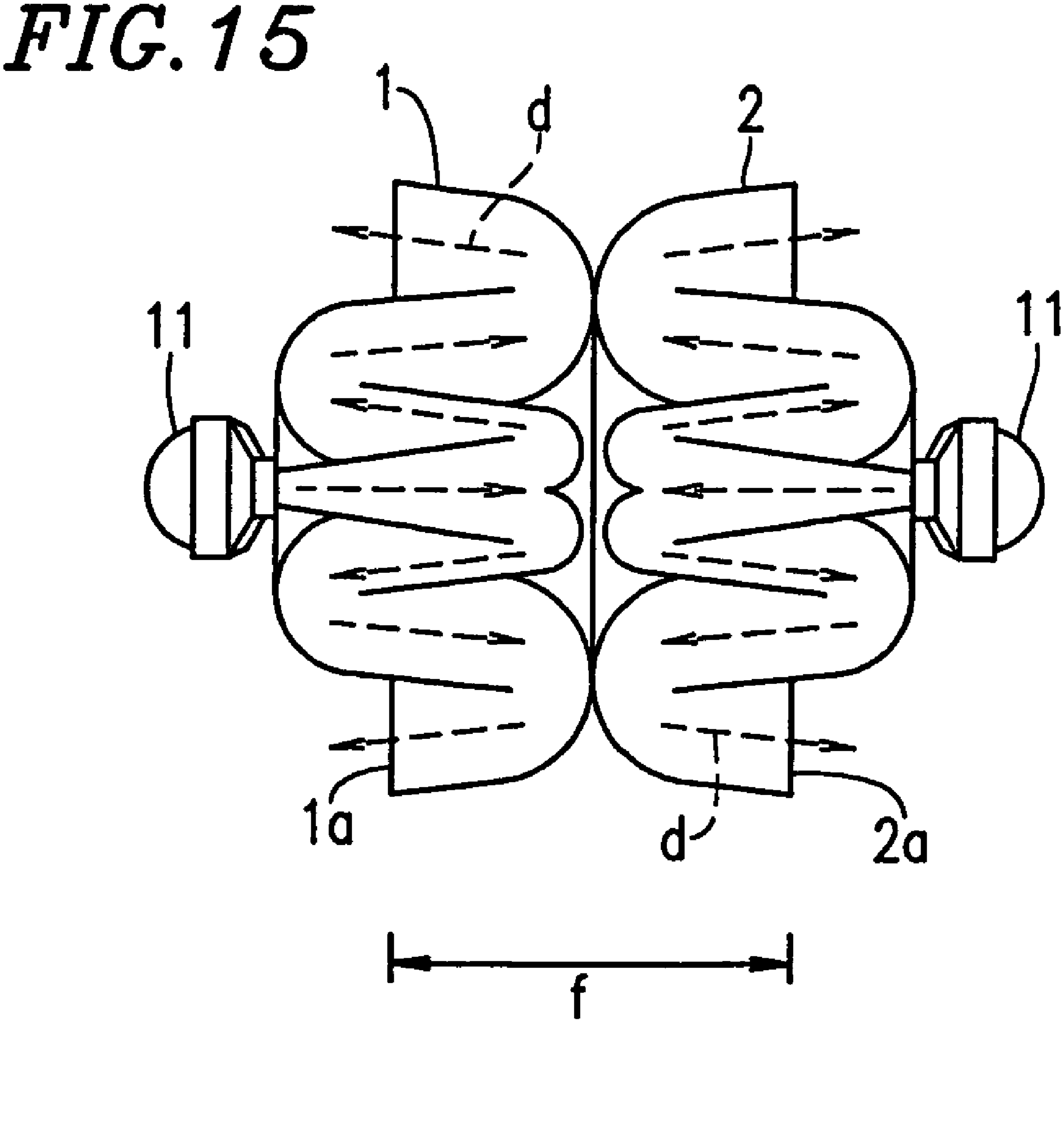
FIG. 15 is a diagram schematically illustrating a part of a structure of an amplification-sound apparatus of Embodiment 7 of the present invention.

Furthermore, as illustrated in FIG. 15, because the horn is folded back an odd number of times, when employing a reentrant horn of this structure for each of an amplified sound source 1 and a control sound source 2, the length f between acoustic radiation planes 1*a* and 2*a*, which are open ends of the reentrant horns, can be reduced. Thus, a dipole directional radiation pattern of a narrow directionality angle can be obtained. Moreover, by folding back the horn, it is possible to prevent wind and rain from entering the horn driver 11.

FIGS. 14 and 15 illustrate a case where the horn is folded back three times. However, it is understood that substantially the same effects can be obtained with any other odd number of times the horn is folded back.

FIG. 13 illustrates a case where the horn is folded back twice. However, it is understood that substantially the same effects can be obtained with any other number of times the horn is folded back.

As described above, with the amplified sound apparatuses according to Embodiments 1 through 7 of the present invention, a control sound source is provided in the vicinity of an amplified sound source, whereby a predetermined directional radiation pattern can be realized. Moreover, when each of an amplified sound source and a control sound source is a horn loudspeaker including a horn driver and an acoustic tube, better directional and acoustic characteristics are achieved for an externally radiated sound. When a reentrant horn is used as an acoustic tube, a sound-amplification apparatus with a reduced size is realized.

Embodiment 8

A directional loudspeaker apparatus 210 as a sound-amplification apparatus according to Embodiment 8 of the present invention will be described with reference to the figures.

Figure 16:
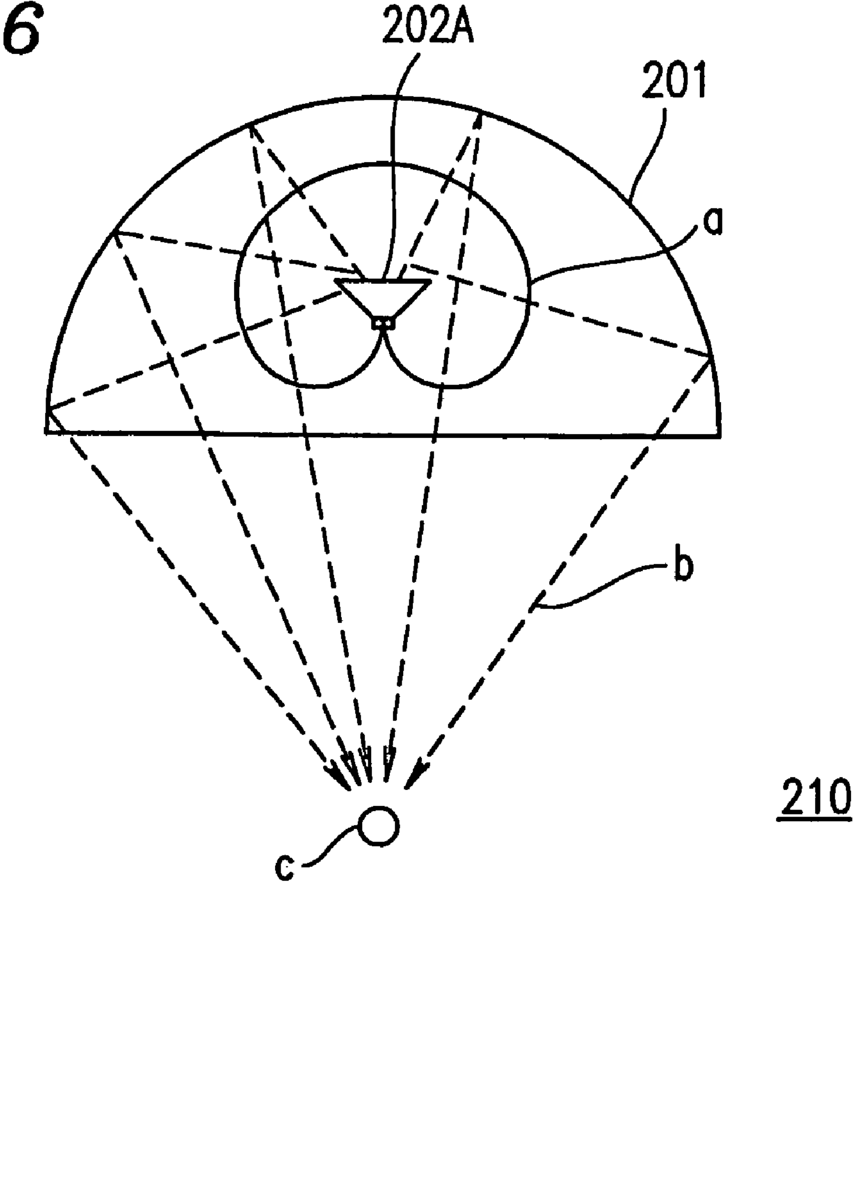
FIG. 16 is a diagram schematically illustrating a structure of a directional loudspeaker apparatus of Embodiment 8 of the present invention.

FIG. 16 is a diagram schematically illustrating a structure of the directional loudspeaker apparatus 210 of the present embodiment. The directional loudspeaker apparatus 210 includes a reflector 201 and a sound source 202A. The sound source 202A is a loudspeaker which has a directional radiation pattern shown by a curved line a. The sound source 202A has a sound characteristic which is particularly weak in a rearward direction, and a sound receiving point c is in that direction. The sound source 202A is provided within the reflector 201 so that a sound radiated from the sound source 202A (amplified sound) is mostly reflected by the reflector 201 to reach the sound receiving point c via the route shown by a straight line b.

A portion of the sound source 202A which is not covered with the reflector 201 has reduced acoustic radiation, thereby reducing the amount of amplified sound which is directly scattered without being reflected by the reflector 201. Thus, portions of the amplified sound which reach the sound receiving point c will be in phase with one another, and a sound pressure is added to the amplified sound, whereby a sharp directional radiation pattern is achieved.

Figure 17A:
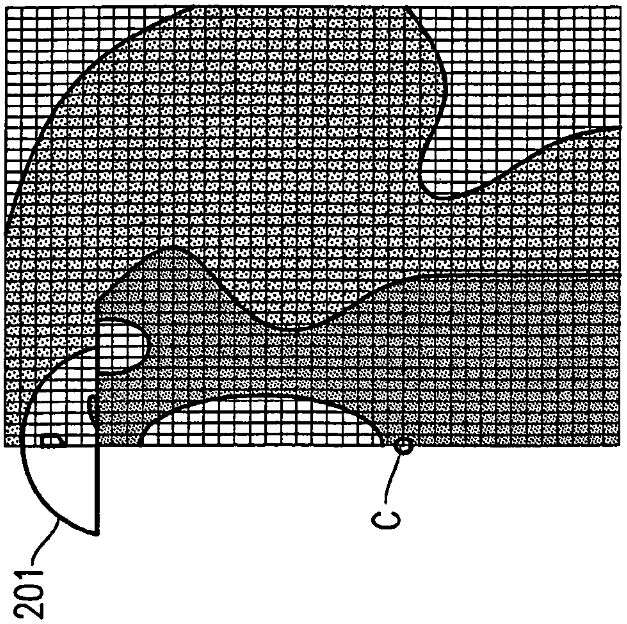
FIG. 17A shows a simulated sound pressure distribution of an amplified sound radiated from a conventional directional loudspeaker apparatus.
Figure 17B:
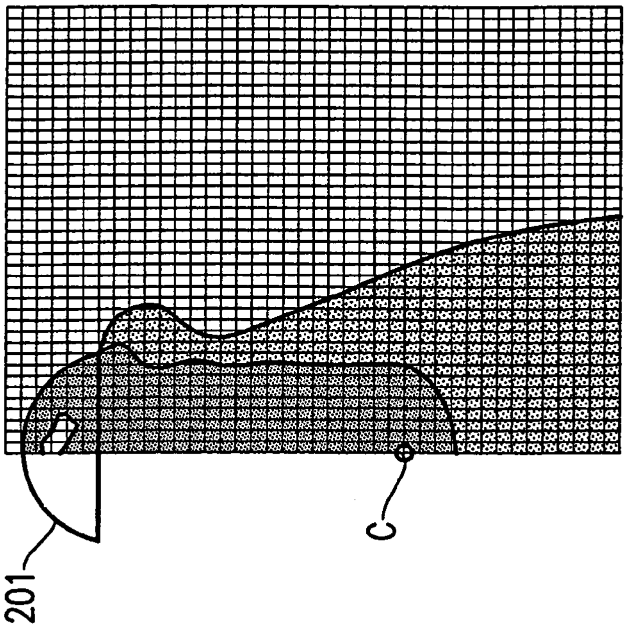
FIG. 17B shows a simulated sound pressure distribution of an amplified sound radiated from the directional loudspeaker apparatus shown in FIG. 16.
Figure 17C:
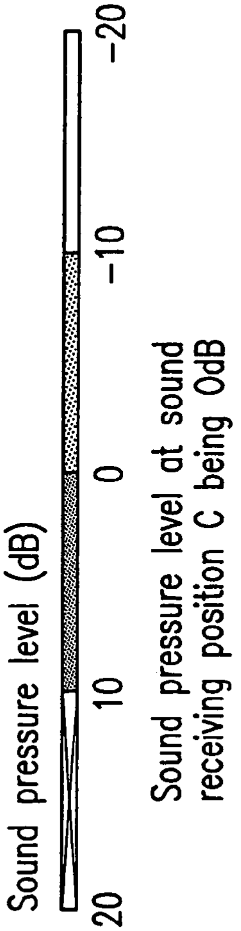
FIG. 17C shows a gauge for the sound pressure shown in FIGS. 17A and 17B.

Each of FIGS. 17A and 17B shows a sound pressure distribution of an amplified sound radiated by a directional loudspeaker apparatus as obtained by a simulation based on a boundary element method. FIG. 17A shows the sound pressure distribution for a conventional directional loudspeaker apparatus, while FIG. 17B shows a distribution of the directional loudspeaker apparatus 210 of the present embodiment. Each of FIGS. 17A and 17B shows a sound pressure level at each point according to the gauge shown in FIG. 17C, with the sound pressure level at the sound receiving point c being 0 dB. Accordingly, it can be seen that the sound extension of the directional loudspeaker apparatus 210 of the present embodiment is narrower than that of the conventional directional loudspeaker apparatus in FIG. 17A indicating that the directional radiation pattern is controlled sufficiently.

Embodiment 9

Next, a directional loudspeaker apparatus 220 as a sound-amplification apparatus according to Embodiment 9 of the present invention will be described with reference to the figures.

Figure 18:
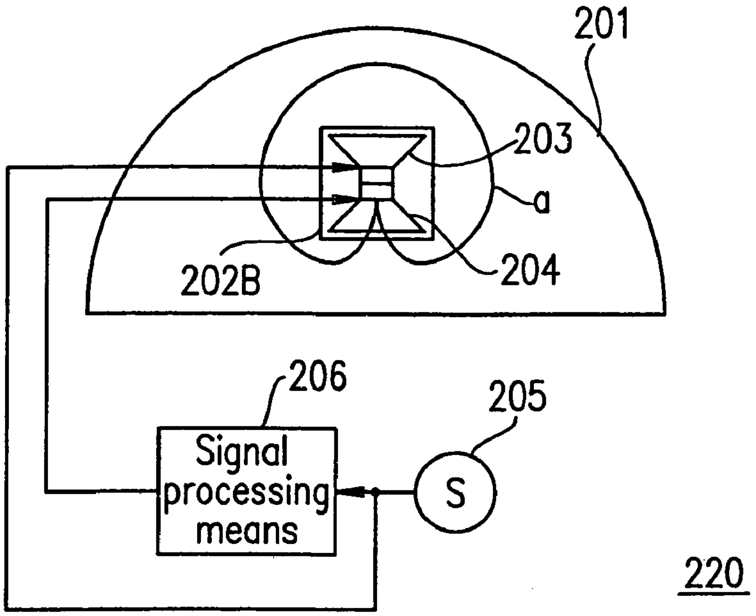
FIG. 18 is a diagram schematically illustrating a structure of a directional loudspeaker apparatus of Embodiment 9 of the present invention.

FIG. 18 is a diagram schematically illustrating a structure of the directional loudspeaker apparatus 220 of the present embodiment. The same elements as those in the directional loudspeaker apparatus 210 of Embodiment 8 are indicated by the same references, and thus will not be further described.

The directional loudspeaker apparatus 220 includes a reflector 201, a sound source 202B, an acoustic signal source 205, and signal processing means 206. As shown in FIG. 18, the sound source 202B is provided within the reflector 201. The sound source 202B includes an amplified sound source 203 and a control sound source 204. The amplified sound source 203 is a loudspeaker which converts the acoustic signal from the acoustic signal source 205 to an amplified sound to radiate the amplified sound and is provided facing the center of the reflector 201. The signal processing means 206 controls the amplitude and the phase of the acoustic signals from the acoustic signal source 205 so that the output characteristic of the sound source 202B is unidirectional, thereby outputting the control signal to the control sound source 204 as a control sound signal. The control sound source 204 is a loudspeaker which converts the control sound signal from the signal processing means 206 to a control sound to radiate the control sound and is provided coaxially with, and opposite to, the amplified sound source 203.

With such a structure, interference occurs between the amplified sound radiated from the amplified sound source 203 and the control sound radiated from the control sound source 204, and thus the sound pressure in the acoustic space directly formed in the rearward space behind the sound source 202B (in front of the control sound source 204) can be further reduced by controlling the phase and/or amplitude of the control sound source. Therefore, it is possible to obtain the strong directional radiation pattern as indicated by a curved line a.

Since the reflector 201 functions as in Embodiment 8 in connection with the sound source 202B having such a strong directionality, an amplified sound which is radiated from the sound source 202B and reflected by the reflector 201 is more localized at the sound receiving point. Because a direct sound which has not been reflected by the reflector 201 does not reach the sound receiving point, the sound wave at the sound receiving point has a reduced phase-mismatch, thereby improving the sound pressure at the sound receiving point.

Embodiment 10

Next, a directional loudspeaker apparatus 230 as a sound-amplification apparatus according to Embodiment 10 of the present invention will be described with reference to the figures.

Figure 19:
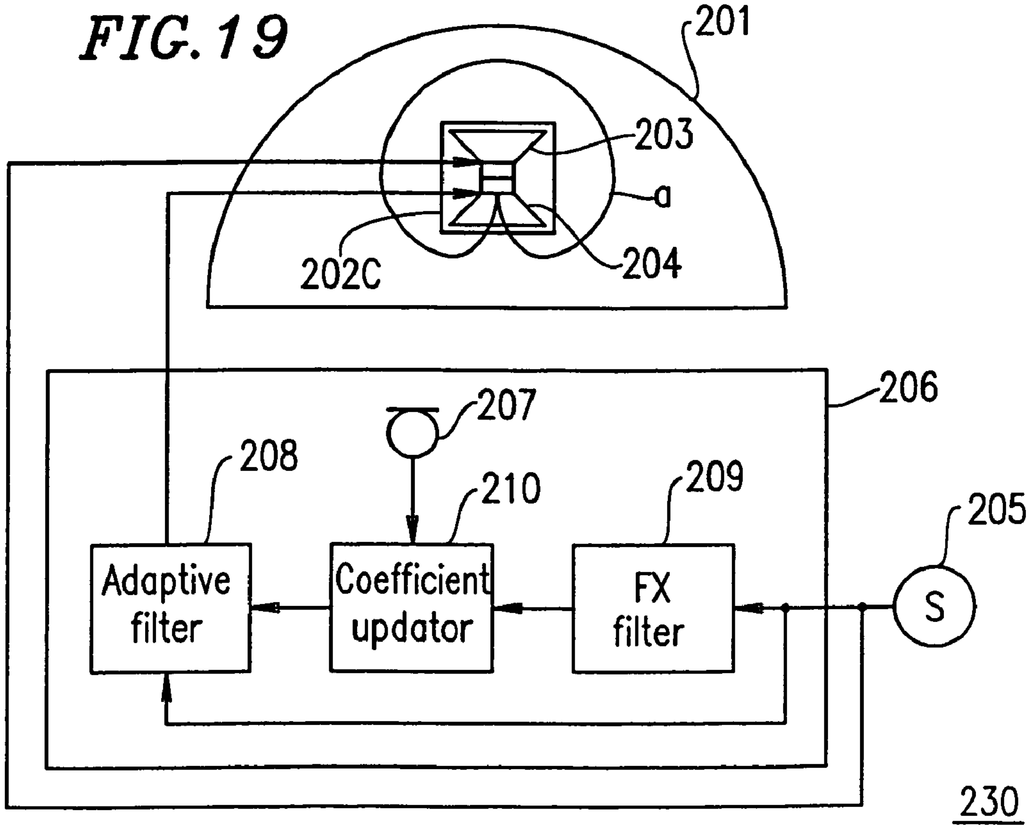
FIG. 19 is a diagram schematically illustrating a structure of a directional loudspeaker apparatus of Embodiment 10 of the present invention.

FIG. 19 is a diagram schematically illustrating a structure of the directional loudspeaker apparatus 230 of the present embodiment. The same elements as those in the directional loudspeaker apparatus 220 of Embodiment 9 are indicated by the same references, and thus will not be further described.

The directional loudspeaker apparatus 230 includes a reflector 201, a sound source 202C, an acoustic signal source 205, and signal processing means 206. As in the case of FIG. 18, the sound source 202C includes the amplified sound source 203 and the control sound source 204 which is provided coaxially with, and opposite to, each other.

The signal processing means 206 includes an error detector 207, an adaptive filter 208, a filtered X-filter (an FX filter) 209, and a coefficient updator 210. The error detector 207 is a microphone which is provided in the vicinity of the control sound source 204. The FX filter 209 is a filter which is set to a characteristic equal to a transfer function C from the control sound source 204 to the error detector 207. The adaptive filter 208 is a filter which performs a convolution calculation on the acoustic signal input from the acoustic signal source 205 with a transfer function F, and provides the obtained calculation result to the control sound source 204 as a control sound signal.

The coefficient updator 210 uses an LMS (Least Mean Square) algorithm, or the like, with the output from the FX filter 209 being a reference signal and the output from the error detector 207 being an error signal, to update the coefficient of the adaptive filter 208 by performing a coefficient update calculation such that the error signal is minimized.

It is assumed that the transfer function from the amplified sound source 203 to the error detector 207 is G and the transfer function from the control sound source 204 to the error detector 207 is C. When the coefficient updator 210 is operated to cause the adaptive filter 208 to converge, the output signal from the error detector 207 approaches 0. In this case, the transfer function F of the adaptive filter 208 converges to a characteristic of –G/C.

For an acoustic signal s, a radiated sound from the amplified sound source 203 as it is received at the error detector 207 is represented as:

$$s \cdot G.$$

On the other hand, the control sound from the control sound source 204 as it is received at the error detector 207 is represented as:

$$s \cdot (-G/C) \cdot C = -s \cdot G.$$

Therefore, the amplified sound and the control sound interfere with each other at the position of the error detector 207. Thus, $$s \cdot G + (-s \cdot G) = 0.$$

In this manner, at the position of the error detector 207, the amplified sound is canceled out by the control sound, thereby realizing a directional radiation pattern with the least acoustic radiation toward the position of the error detector 207. As a result, a direct sound which has not been reflected by the reflector 201 does not reach the sound receiving point. Therefore, an amplified sound with a high sound pressure is localized at the sound receiving point, whereby the directional radiation pattern becomes sharper.

Embodiment 11

Next, a directional loudspeaker apparatus 240 as a sound-amplification apparatus according to Embodiment 11 of the present invention will be described with reference to the figures.

Figure 20:
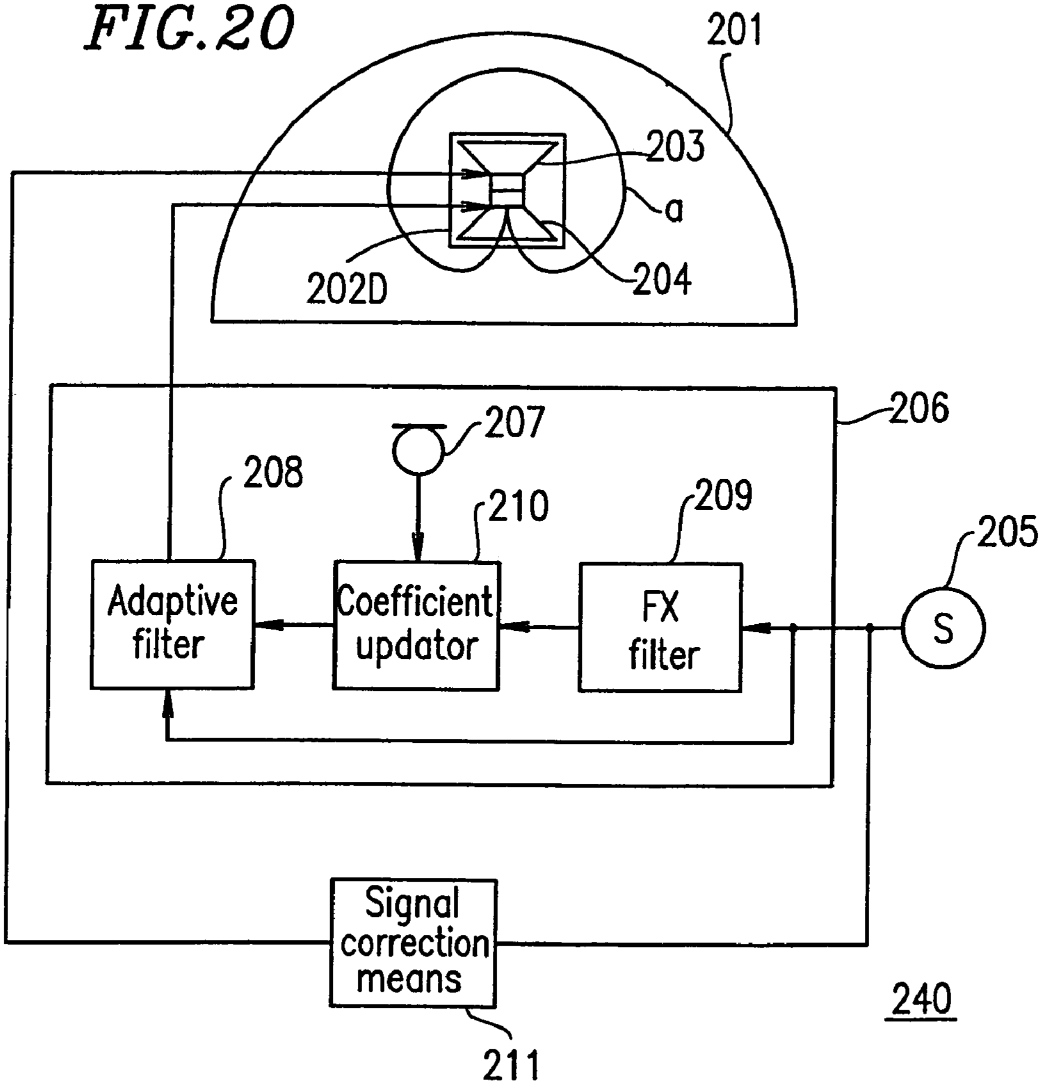
FIG. 20 is a diagram schematically illustrating a structure of a directional loudspeaker apparatus of Embodiment 11 of the present invention.

FIG. 20 is a diagram schematically illustrating a structure of the directional loudspeaker apparatus 240 of the present embodiment. The same elements as those in the directional loudspeaker apparatus 230 of Embodiment 10 are indicated by the same references, and thus will not be further described.

The directional loudspeaker apparatus 240 includes a reflector 201, a sound source 202D, an acoustic signal source 205, and signal processing means 206. The sound source 202D includes the amplified sound source 203 and the control sound source 204 provided coaxially with, and opposite to each other as in the case of FIG. 19. The signal processing means 206 includes an error detector 207, an adaptive filter 208, an FX filter 209, and a coefficient updator 210, as in Embodiment 10.

In the directional loudspeaker apparatus 240, a signal correction means 211 is provided between the acoustic signal source 205 and the amplified sound source 203. Assuming that the time required by the signal processing means 206 for a signal processing operation is τ1, and the time required for the control sound radiated from the control sound source 204 to reach the error detector 207 is τ2, the signal correction means 211 sets a delay time which is approximately equal to τ1+τ2 for the acoustic signal s, and desirably controls the amplitude and the phase of the acoustic signal s. The signal correction means 211 outputs the obtained signal as a result of such a process to the amplified sound source 203.

With such an arrangement, it is possible to adjust the delay time of the signal which is input to the amplified sound source 203 with the signal correction means 211. Thus, a desirable directional radiation pattern can be realized even when the distance from the amplified sound source 203 to the error detector 207 is shorter than that from the control sound source 204 to the error detector 207, and when an amount of time is required for signal processing by the FX filter 209, the coefficient updator 210, and the adaptive filter 208. For example, when the amount of time required for processing by the signal processing means 206 is longer than the propagation time of the amplified sound, the causality between the above-mentioned transfer functions is not satisfied. However, the directional loudspeaker apparatus 240 avoids such a problem. Moreover, the signal correction means 211 can desirably correct the acoustic characteristic such as the amplitude and the phase of the amplified sound radiated from the amplified sound source 203, whereby a listener can receive a sound with a desirable sound quality.

Embodiment 12

Next, a directional loudspeaker apparatus as a sound-amplification apparatus according to Embodiment 12 of the present invention will be described with reference to the figures.

Figure 21:
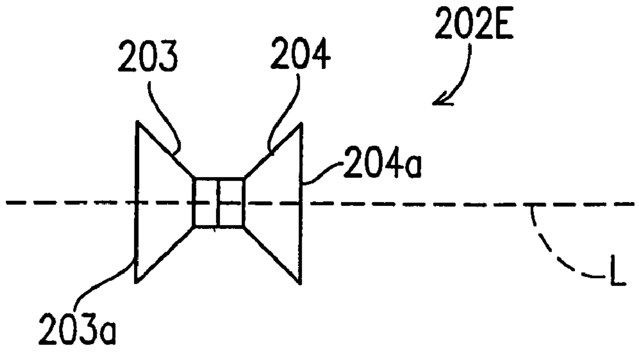
FIG. 21 is a diagram schematically illustrating a part of a structure of a directional loudspeaker apparatus of Embodiment 12 of the present invention.

FIG. 21 only illustrates a sound source 202E among other elements of the directional loudspeaker apparatus of the present embodiment. In the sound source 202E, the amplified sound source 203 and the control sound source 204 are provided coaxially with each other. Specifically, the control sound source 204 is coaxially arranged so that an acoustic radiation plane **204*a* is symmetrical with an amplified sound plane 203*a* of the amplified sound source 203. An error detector 207 is provided in front of the control sound source 204**. The other elements may be the same as those of any of the sound-amplification apparatuses illustrated in the foregoing embodiments.

With such an arrangement, a directional radiation pattern obtained by interference between the amplified sound from the amplified sound source 203 and the control sound from the control sound source-204 can be axially symmetrical, the sound pressure directional radiation pattern can also be unidirectional, thereby facilitating the positioning of the sound source 202E.

Embodiment 13

Next, a directional loudspeaker apparatus 260 as a sound-amplification apparatus according to Embodiment 13 of the present invention will be described with reference to the figures.

Figure 22:
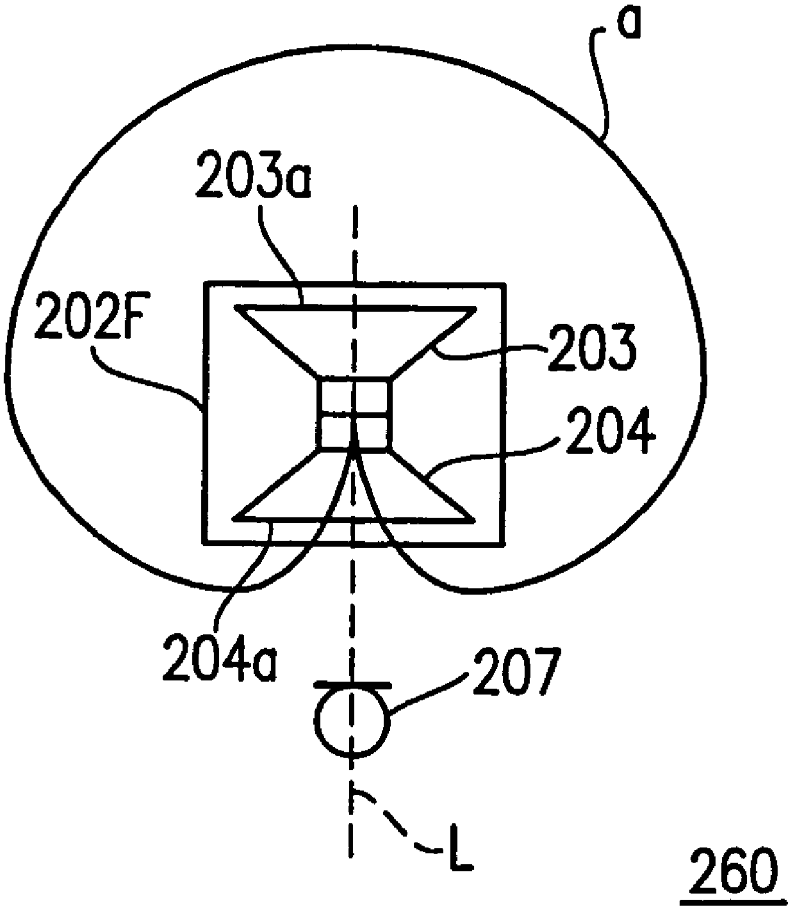
FIG. 22 is a diagram schematically illustrating a structure of a directional loudspeaker apparatus of Embodiment 13 of the present invention.

FIG. 22 only illustrates a sound source 202F among other elements of the directional loudspeaker apparatus 260 of the present embodiment. In the sound source 202F, the positions of an amplified sound source 203, a control sound source 204, and an error detector 207 are provided coaxially with one another. Moreover, the error detector 207 is arranged in the vicinity of the control sound source 203 and along a straight line L which passes through the center of an acoustic radiation plane 203*a* and the center of an acoustic radiation plane 204*a*. The other elements may be the same as those of any of the sound-amplification apparatuses illustrated in the foregoing embodiments.

With such an arrangement, when the amplified sound from the amplified sound source 203 interferes with, and is canceled out by, the control sound from the control sound source 204 at the position of the error detector 207, the resulting directional radiation pattern a will be axially symmetric with respect to the straight line L, thereby facilitating the positioning of the sound source 202F.

As described above, according to the directional loudspeaker apparatuses of Embodiments 8 through 13 of the present invention, an amplified sound radiated from the back of the sound source is reduced, and a sharp directional radiation pattern can be realized with a reflector.

In Embodiments 14 through 23 of the present invention to be described below, several embodiments of an on-vehicle sound-amplification apparatus using a sound-amplification apparatus having an intended directionality according to the present invention as an on-vehicle sound-amplification apparatus will be described, as a specific application of the present invention.

Embodiment 14

Figure 23:
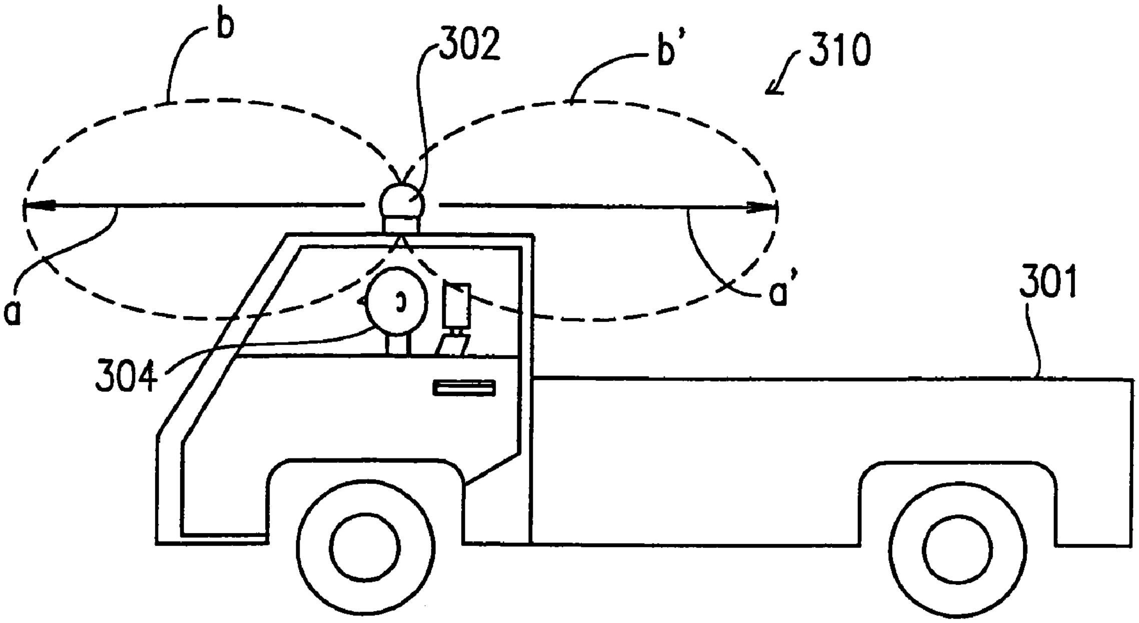
FIG. 23 is a diagram schematically illustrating a structure of an on-vehicle amplification-sound apparatus of Embodiment 14 of the present invention as applied to a truck-type vehicle.
Figure 24:
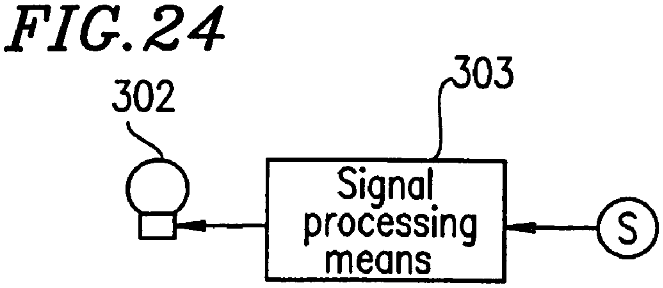
FIG. 24 is a block diagram illustrating an electric circuit in the apparatus structure shown in FIG. 23.

Each of FIGS. 23 and 24 is a diagram illustrating a structure of an amplification-sound apparatus 310 according to Embodiment 14 of the present invention. Specifically, FIG. 23 is a diagram schematically illustrating a structure of the apparatus 310 where the amplification-sound apparatus of the present invention is mounted on a truck-type vehicle as an on-vehicle acoustic reproducing apparatus, and FIG. 24 is a diagram schematically illustrating a flow of electric signals in such a case. In FIGS. 23 and 24, reference numeral 301 is a vehicle body, 302 is a dipole sound source, 303 is signal processing means, 304 is a driver, a and a' are main axes of acoustic radiation of the dipole sound source 302, b and b' are directional radiation patterns of the dipole sound source 302, and s is an acoustic signal.

The dipole sound source 302 is provided in the vicinity of the driver 304, the acoustic signal s is amplified by the signal processing means 303 and then input to the dipole sound source 302 to be acoustically radiated therefrom as a reproduced sound. The main axes of the acoustic radiation a and a' form the directional radiation patterns b and b' which are directed to a direction away from the vehicle body 301. On the other hand, in a vicinity of the line between the dipole sound source 302 and the driver 304, the radiated sounds interfere with, and are canceled by, one another. Thus, the radiated sound decreases, whereby substantially no direct sound from the dipole sound source 302 reaches to a location in the vicinity of the driver 304. Therefore, it is possible to obtain a desirable sound environment in which a sufficient volume of sound is ensured along the main axes of the acoustic radiation a and a', while reducing the volume of sound in the vicinity of the driver 304.

Although the dipole sound source 302 is provided in the vicinity of the driver 304 in FIG. 23, when it is provided in the vicinity of any other passenger (e.g., in the vicinity of the passenger seat), substantially the same effects can be obtained in the vicinity of the respective passenger.

In FIG. 23, the present invention is applied to a truck-type vehicle, but substantially the same effects can be obtained with any other type of vehicles such as a sedan, a van, or a wagon type, or with any other transportation means such as a ship.

Embodiment 15

Next, an amplification-sound apparatus 320 according to Embodiment 15 of the present invention will be described with reference to FIGS. 25 and 26.

Figure 25:
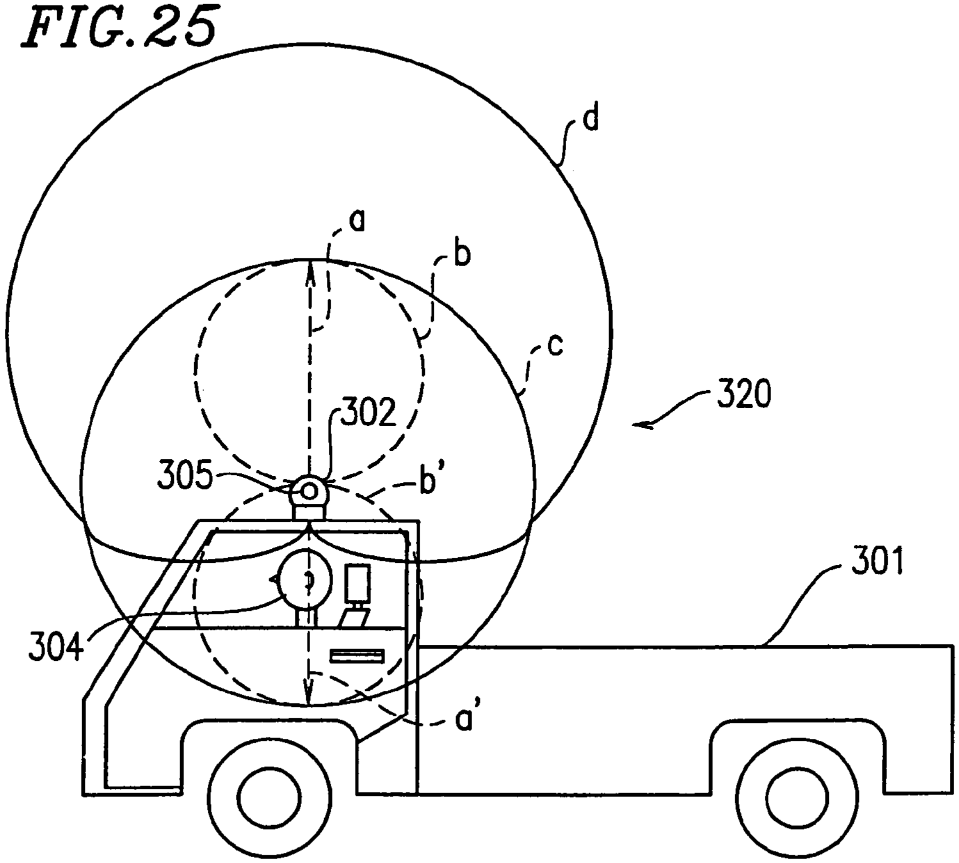
FIG. 25 is a diagram schematically illustrating a structure of an on-vehicle amplification-sound apparatus of Embodiment 15 of the present invention as applied to a truck-type vehicle.
Figure 26:
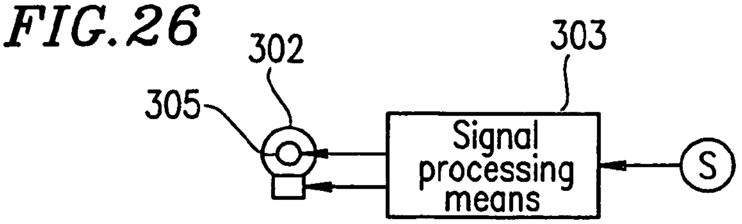
FIG. 26 is a block diagram illustrating an electric circuit in the apparatus structure shown in FIG. 25.

FIG. 25 is a diagram schematically illustrating a structure of the apparatus 320 where the amplification-sound apparatus of the present invention is mounted on a truck-type vehicle as an on-vehicle acoustic reproducing apparatus, and FIG. 26 is a diagram schematically illustrating a flow of electric signals in such a case. The same elements as those of Embodiment 15 are indicated by the same references, and thus will not be further described. This also applies to each of the subsequent embodiments.

In FIGS. 25 and 26, reference numeral 305 is a non-directional sound source, c is a directional radiation pattern of the non-directional sound source 305, d is a unidirectional radiation pattern which is achieved in the present embodiment.

A dipole sound source 302 is provided in the vicinity of the driver 304, the non-directional sound source 305 is provided in the central portion of the dipole sound source 302. An acoustic signal s is amplified and phase-adjusted by the signal processing means 303, and the acoustic signal s is then input to the dipole sound source 302 and the non-directional sound source 305 to be acoustically radiated therefrom as a reproduced sound.

An acoustic radiation main axis a' of the dipole sound source 302 is directed toward the driver 304 and forms a directional radiation pattern b'. On the other hand, an acoustic signal s is amplified and phase-adjusted by the signal processing means 303 so as to have a phase substantially opposite to that of the acoustic radiation forming the directional radiation pattern b', and the signal is input to the non-directional sound source 305. The non-directional sound source 305 acoustically radiates signal as a reproduced sound simultaneously with the dipole sound source 302.

With such an arrangement, a sound radiated from the dipole sound source 302 and a sound radiated from the non-directional sound source 305 are interfered with, and canceled out by, each other in the vicinity of the driver 304. Thus, the radiated sound decreases, and the directional radiation pattern d becomes a unidirectional radiation pattern directed exclusively along the acoustic radiation main axis a. Therefore, it is possible to obtain a desirable sound environment in which a sufficient volume of sound is ensured along the acoustic radiation main axis a, while the volume of sound is reduced in the vicinity of the driver 304.

In the present embodiment, when the dipole sound source 302 is provided in the vicinity of any other passenger (e.g., in the vicinity of the passenger seat), substantially the same effects can be obtained in the vicinity of the respective passenger. With any other type of vehicles such as a sedan, a van, or a wagon type, or with any other transportation means such as a ship, substantially the same effects can also be obtained.

Embodiment 16

Figure 27:
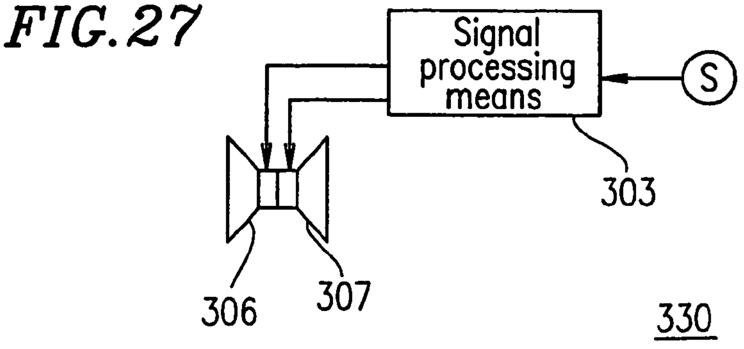
FIG. 27 is a block diagram illustrating an electric circuit in the structure of an on-vehicle amplification-sound apparatus of Embodiment 16 of the present invention as applied to a truck-type vehicle.

FIG. 27 is a diagram illustrating a flow of electric signals in an amplification-sound apparatus 330 according to Embodiment 16 of the present invention. FIGS. 28A to 28D are diagrams respectively illustrating various directional radiation patterns e1 to e4 of acoustic radiation obtained by the amplification-sound apparatus 330 of the present embodiment.

Figure 28A:
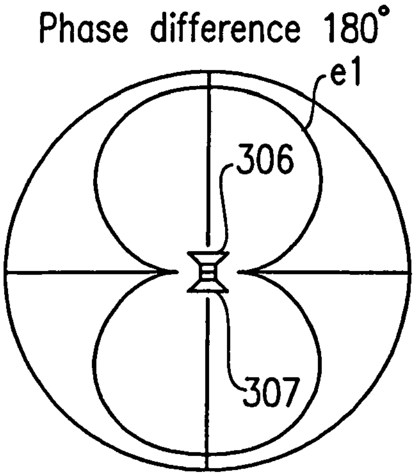
FIG. 28A is a diagram illustrating the results of a simulation based on a boundary element method for a directional radiation pattern obtained when the phase difference between two loudspeakers included in an on-vehicle amplification-sound apparatus according to Embodiment 16 of the present invention is 180°.
Figure 28B:
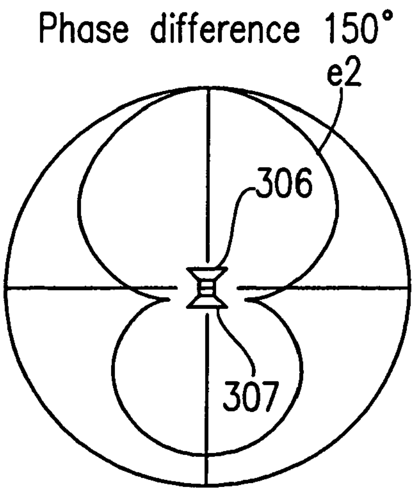
FIG. 28B is a diagram illustrating the results of a simulation based on a boundary element method for a directional radiation pattern obtained when the phase difference between two loudspeakers included in an on-vehicle amplification-sound apparatus according to Embodiment 16 of the present invention is 150°.
Figure 28C:
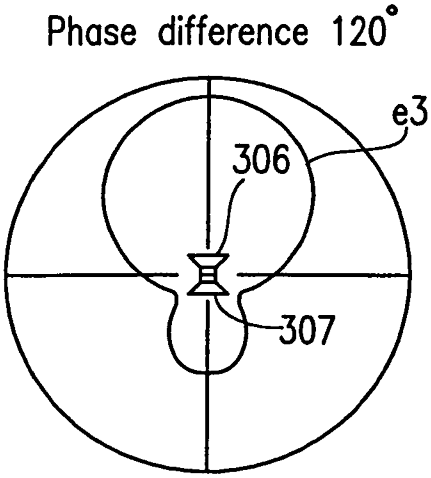
FIG. 28C is a diagram illustrating the results of a simulation based on a boundary element method for a directional radiation pattern obtained when the phase difference between two loudspeakers included in an on-vehicle amplification-sound apparatus according to Embodiment 16 of the present invention is 120°.
Figure 28D:
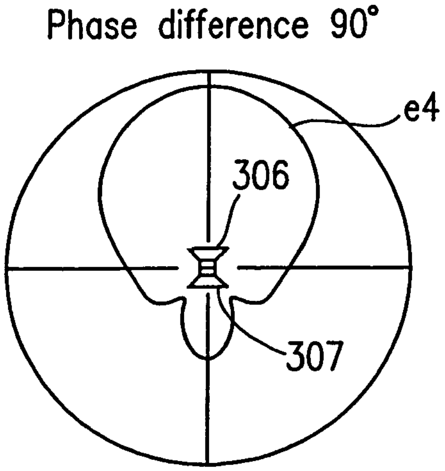
FIG. 28D a diagram illustrating the results of a simulation based on a boundary element method for a directional radiation pattern obtained when the phase difference between two loudspeakers included in an on-vehicle amplification-sound apparatus according to Embodiment 16 of the present invention is 90°.

In FIG. 27, reference numerals 306 and 307 are loudspeakers arranged so that the respective acoustic radiation planes thereof are directed opposite to each other. Reference numeral e1 in FIG. 28A is a directional radiation pattern of an acoustic radiation which is obtained when the phase difference between the loudspeaker 306 and the loudspeaker 307 is 180°, e2 in FIG. 28B is a directional radiation pattern of the acoustic radiation which is obtained when the aforementioned phase difference is 150°. Similarly, e3 shown in FIG. 28C and e4 shown in FIG. 28D are directional radiation patterns of the acoustic radiation which are obtained when the aforementioned phase difference are 120° and 90°, respectively.

In the present embodiment, the phase difference between the radiated sounds respectively from the loudspeakers 306 and 307 can be varied since the phase of an acoustic signal input to at least one of the loudspeakers can be varied by the signal processing means 303. Thus, the positions in which the reproduced sounds from the loudspeakers 366 and 307 are interfered with, and canceled out by each other, can be changed to directional radiation patterns e1 to e4. Thus, even when the loudspeaker is not provided in the vicinity of the driver 304, substantially the same effects can be obtained as those obtained when the loudspeaker is provided in the vicinity of the driver 304.

Embodiment 17

Figure 29:
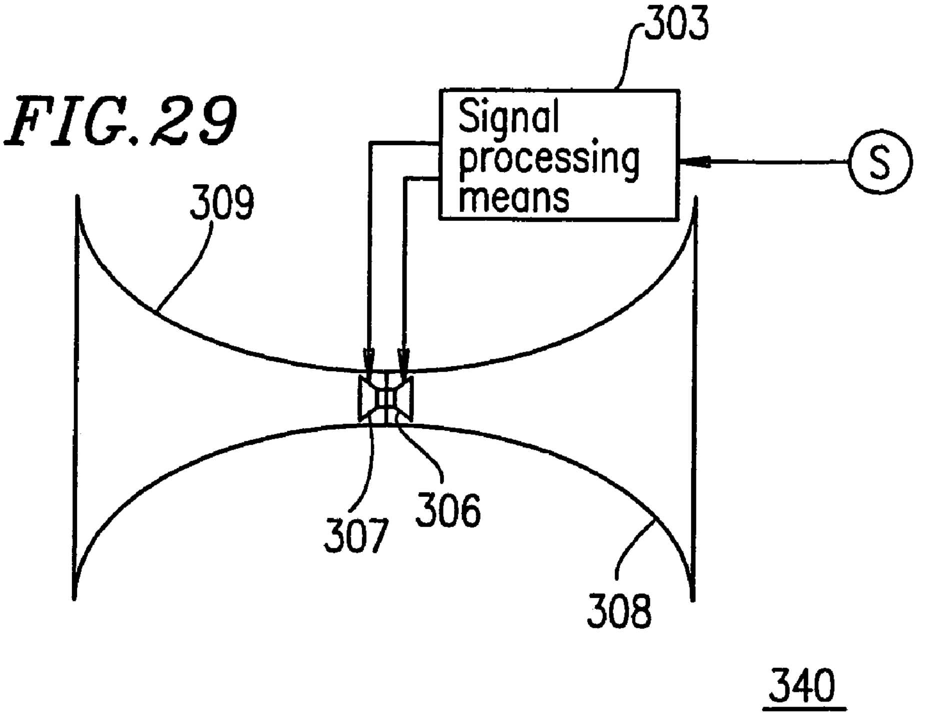
FIG. 29 is a block diagram illustrating a sound source structure of an on-vehicle amplification-sound apparatus of Embodiment 17 of the present invention and an electric circuit thereof.

FIG. 29 is a diagram schematically illustrating a structure of an amplification-sound apparatus 340 according to Embodiment 17 of the present invention.

In FIG. 29, reference numerals 308 and 309 are acoustic tubes provided in loudspeakers 306 and 307, respectively. Each of the acoustic tubes 308 and 309 has a continuously varied cross-sectional area along a plane perpendicular to the sound wave traveling direction. Therefore, the frequency change in the acoustic impedance of the acoustic tubes 308 and 309 along the axes thereof is reduced, thereby reducing the disturbance in the sound pressure frequency characteristic of the radiated sound from the acoustic tubes 308 and 309. Thus, it is possible to obtain a desirable directional radiation pattern and a desirable acoustic characteristic.

In the present embodiment, acoustic tubes are used for the loudspeakers 306 and 307, but it is understood that when using horn drivers for the loudspeakers 306 and 307 instead of the tubes, substantially the same effects can be obtained. This also applies to each of the subsequent embodiments.

Embodiment 18

Next, a sound-amplification apparatus 350 according to Embodiment 18 of the present invention will be described with reference to FIG. 30.

Figure 30:
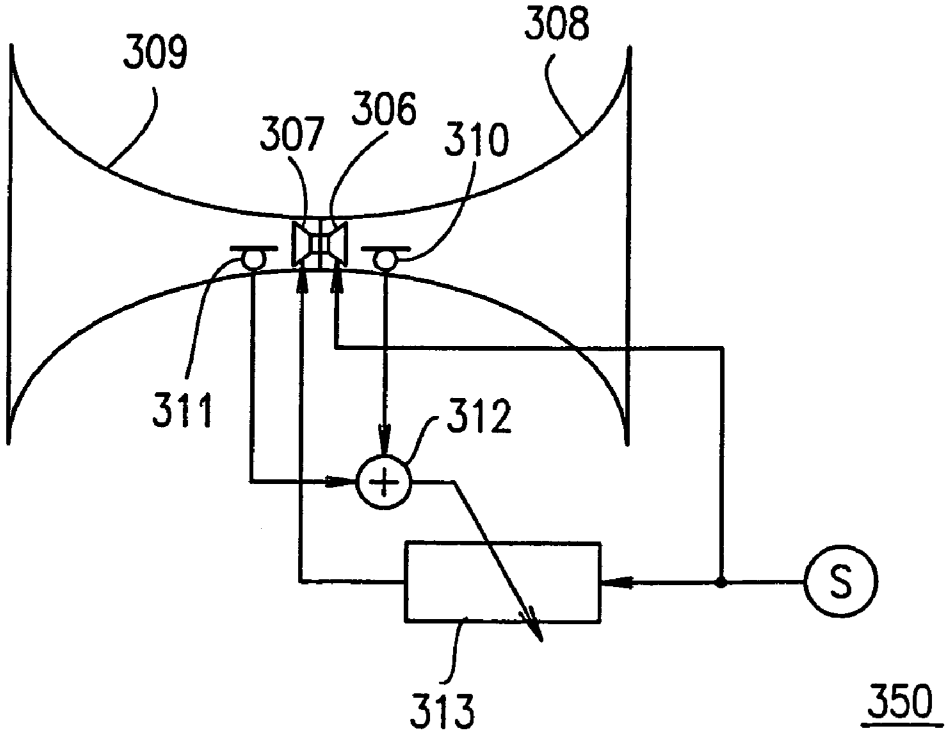
FIG. 30 is a block diagram illustrating a sound source structure of an on-vehicle amplification-sound apparatus of Embodiment 18 of the present invention and an electric circuit thereof.

In FIG. 30, reference numeral 310 is a radiated sound detector, 311 is an error detector, 312 is an adder, and 313 is calculation means. The radiated sound from a loudspeaker 306 to which the acoustic signal s is directly input is detected at the radiated sound detector 310, and the obtained result is input to the adder 312. The control sound from a loudspeaker 307 is detected at the error detector 311, and the obtained result is also input to the adder 312. After adding the two above-described inputs in the adder 312, the output therefrom is input to the calculation means 313. The calculation means 313, to which the acoustic signal s and the output from the adder 312 are input, uses an LMS (Least Mean Square) algorithm, or the like, to perform a calculation such that the output from the adder 312 is always small, and then outputs the obtained signal to the loudspeaker 307 as a control signal.

The radiated sound detector 310 and the error detector 311 are provided in the vicinity of the loudspeakers 306 and 307, respectively. With this arrangement, assuming that the transfer function from the loudspeaker 306 to the radiated sound detector 310 is G and the transfer function from the loudspeaker 307 to the error detector 311 is C, the calculation means 313 has a characteristic of −G/C when the calculation means 313 is operated and the output from the adder 312 approaches 0. Thus, for an acoustic signal s, a radiated sound from the loudspeaker 306 as it is received at the radiated sound detector 310 is represented as:

$$s \cdot G.$$

On the other hand, the control sound from the loudspeaker 307 as it is received at the error detector 311 is represented as:

$$s \cdot (-G/C) \cdot C = -s \cdot G.$$

The output from the radiated sound detector 310 and the output from the error detector 311 as they are added at the adder 312 is represented as:

$$s \cdot G + (-s \cdot G) = 0.$$

Therefore, by arranging the positions of the radiated sound detector 310 and the error detector 311 so that the transfer function from the loudspeaker 306 to the radiated sound detector 310 and the transfer function from the loudspeaker 307 to the error detector 311 are equal to each other, the radiated sound from the loudspeaker 306 and that from the loudspeaker 307 have the same sound pressure and phases that are different from each other by 180°, thus the variation in the characteristics of the loudspeakers in use is corrected and a desirable dipole characteristic can be obtained. Since the above-described effects are suitably provided while the signal processing means 303 is in operation, it is possible to address a non-linear change such as aging of the apparatus.

Embodiment 19

Figure 31:
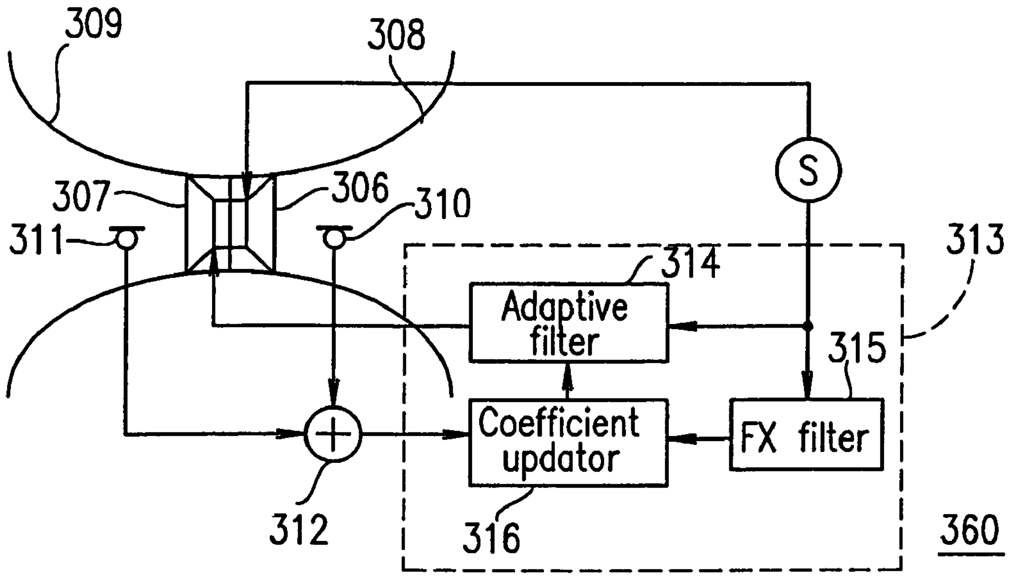
FIG. 31 is a block diagram illustrating a sound source structure of an on-vehicle amplification-sound apparatus of Embodiment 19 of the present invention and an electric circuit thereof.

FIG. 31 is a diagram schematically illustrating a structure of the amplification-sound apparatus 360. In particular, FIG. 31 illustrates the structure of the calculation means 313 of the amplification-sound apparatus 350 in greater detail.

In FIG. 31, reference numeral 314 is an adaptive filter, 315 is a filtered X filter (FX filter) which is set to a characteristic equal to a transfer function from a loudspeaker 307 to an error detector 311, and 316 is a coefficient updator.

The output from an adder 312 is input to an error input terminal of the coefficient updator 316, an acoustic signal s is input to the adaptive filter 314 and the FX filter 315, and the output signal from the FX filter 315 is input to a reference input terminal of the coefficient updator 316. The coefficient updator 316 uses an LMS (Least Mean Square) algorithm, or the like, to perform a coefficient updating calculation such that the error input is always small, thereby updating the coefficient of the adaptive filter 314. The output signal from the adaptive filter 314 is input to the loudspeaker 307.

Assuming that the transfer function from the loudspeaker 306 to the radiated sound detector 310 is G and the transfer function from the loudspeaker 307 to the error detector 311 is C, then, the characteristic of the FX filter 315 is C. When the coefficient updator 316 is operated to cause the adaptive filter 314 to converge, and thus the output signal from the adder 312 approaches 0, the adaptive filter 314 converges to the characteristic of −G/C. Therefore, for an acoustic signal s, a radiated sound from the loudspeaker 306 as it is received at the radiated sound detector 310 is represented as:

$$s \cdot G.$$

On the other hand, the control sound from the loudspeaker 307 as it is received at the error detector 311 is represented as:

$$—s \cdot (-G/C) \cdot C = -s \cdot G.$$

Therefore, by arranging the positions of the radiated sound detector 310 and the error detector 311 so that the transfer function from the loudspeaker 306 to the radiated sound detector 310 and the transfer function from the loudspeaker 307 to the error detector 311 are equal to each other, the radiated sound from the loudspeaker 306 and that from the loudspeaker 307 have the same sound pressure and phases that are different from each other by 180°, thus the variation in the characteristics of the loudspeakers in use is corrected and a desirable dipole characteristic can be obtained.

Embodiment 20

Next, a sound-amplification apparatus 370 according to Embodiment 20 of the present invention will be described with reference to FIG. 32.

Figure 32:
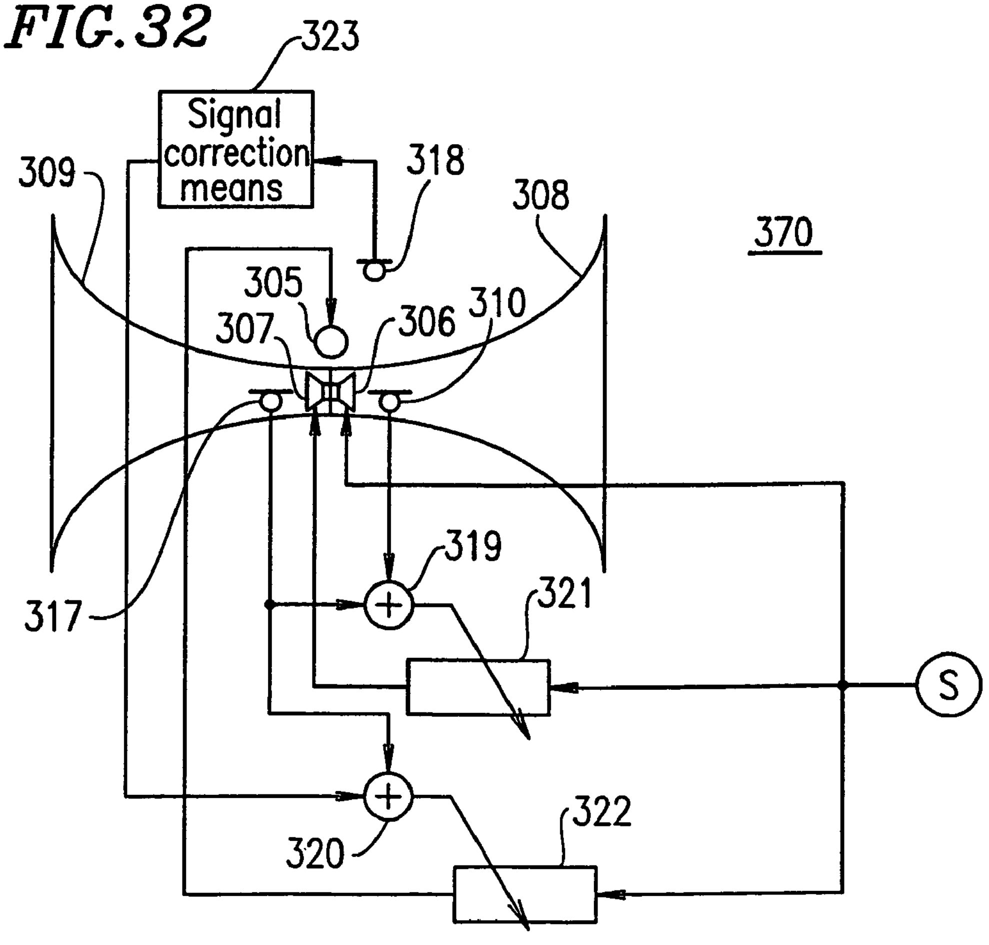
FIG. 32 is a block diagram illustrating a sound source structure of an on-vehicle amplification-sound apparatus of Embodiment 20 of the present invention and an electric circuit thereof.

In FIG. 32, reference numeral 317 is a first error detector, 318 is a second error detector, 319 is a first adder, 320 is a second adder, 321 is first calculation means, 322 is second calculation means, and 323 is signal correction means.

The radiated sound from a loudspeaker 306, to which the acoustic signal s is directly input, is detected at the radiated sound detector 310, and the obtained result is input to the first adder 319. The control sound from a loudspeaker 307 is detected at the first error detector 317, and the obtained result is input to the first adder 319 and the second adder 320. A control sound by a non-directional sound source 305 is detected at the second error detector 318 and the obtained result is input to the signal correction means 323. Furthermore, the output from the signal correction means 323 is input to the second adder 320. The signals input to the first adder 319 and the second adder 320 is added, and output the obtained values to the first calculation means 321 and the second calculation means 322, respectively.

The acoustic signal s and the output from the first adder 319 are input to the first calculation means 321, while the acoustic signal s and the output from the second adder 320 are input to the second calculation means 322. By using an LMS (Least Mean Square) algorithm, or the like, the first calculation means 321 performs a calculation such that the output from the first adder 319 is always small, while the second calculation means 322 performs a calculation such that the output from the second adder 320 is always small, and then outputs the obtained signals to the loudspeaker 307 and the non-directional sound source 305 as control signals, respectively. The radiated sound detector 310 and the error detector 317 are provided in the vicinity of the loudspeakers 306 and 307, respectively, while the second error detector 318 is provided in the vicinity of the non-directional sound source 305.

With this arrangement, assuming that the transfer function from the loudspeaker 306 to the radiated sound detector 310 is G and the transfer function from the loudspeaker 307 to the first error detector 317 is C, the first calculation means 321 converges to a characteristic of −G/C when the first calculation means 321 is operated and the output from the first adder 319 approaches 0. Thus, for an acoustic signal s, a radiated sound from the loudspeaker 306 as it is received at the radiated sound detector 310 is represented as:

$$s \cdot G.$$

On the other hand, the control sound from the loudspeaker 307 as it is received at the first error detector 317 is represented as:

$$s \cdot (-G/C) \cdot C = -s \cdot G.$$

Thus, the output from the radiated sound detector 310 and the output from the first error detector 317 as they are added at the first adder 319 is represented as:

$$s \cdot G + (-s \cdot G) = 0.$$

As described above, by arranging the positions of the radiated sound detector 310 and the first error detector 317 so that the transfer function from the loudspeaker 306 to the radiated sound detector 310 and the transfer function from the loudspeaker 307 to the first error detector 317 are equal to each other, the radiated sound from the loudspeaker 306 and that from the loudspeaker 307 have the same sound pressure and phases that are different from each other by 180°, thus the variation in the characteristics of the loudspeakers in use is corrected and a desirable dipole characteristic can be obtained.

Further, assuming that the transfer function from the non-directional sound source 305 to the second error detector 318 is D and the transfer function characteristic of the signal correction means 323 is H, when the second calculation means 322 is operated and the output from the second adder 320 approaches 0, the second calculation means 322 converges to a characteristic of G/(D·H). On the other hand, for an acoustic signal s, a radiated sound from the loudspeaker 307 as it is received at the first error detector 317 is represented as:

$$-s \cdot G,$$

and the control sound by the non-directional sound source 305 as it is received at the second error detector 318 is represented as:

$$s \cdot (G/(D \cdot H)) \cdot D = s \cdot G/H,$$

and the output signal from the signal correction means 323 is represented as:

$$s \cdot G/H \cdot H = s \cdot G.$$

The output from the first error detector 317 and the output from the signal correction means 323 as they are added at the second adder 320 is represented as:

$$-s \cdot G + s \cdot G = 0.$$

Therefore, by changing the transfer function characteristic H of the signal correction means 323, it becomes possible to readily correct the acoustic radiation conditions of the non-directional sound source 305. For example, when arranging the transfer function from the loudspeaker 307 to the first error detector 317 and the transfer function from the non-directional sound source 305 to the second error detector 318 to be equal, the phase of the radiated sound of the non-directional sound source 305 is varied by 180° with respect to the radiated sound of the loudspeaker 307 while the amplitudes thereof are substantially the same, a unidirectional radiation pattern can be obtained. In this case, if the acoustic radiation main axis of the unidirectional radiation pattern is directed opposite to the position of a passenger (e.g., the driver 304), the direct sound from the sound source scarcely reaches the passenger, thereby attaining a desirable sound environment.

Embodiment 21

Figure 33:
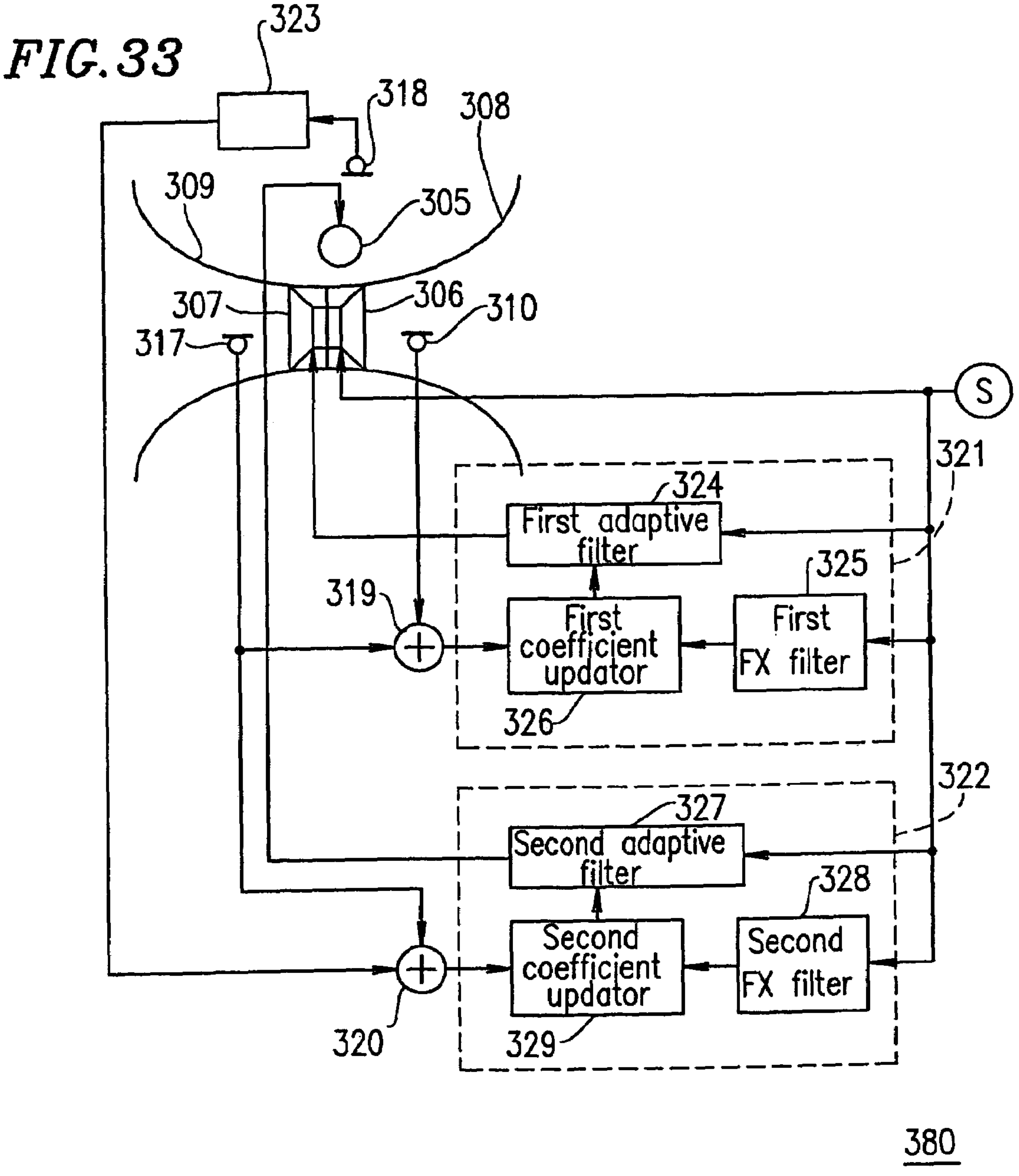
FIG. 33 is a block diagram illustrating a sound source structure of an on-vehicle amplification-sound apparatus of Embodiment 21 of the present invention and an electric circuit thereof.

FIG. 33 is a diagram illustrating a structure of the amplification-sound apparatus 380 according to Embodiment 21 of the present invention, more specifically, illustrating the structures of the first calculation means 321 and the second calculation means 322 of the amplification-sound apparatus 370 of Embodiment 20 in more detail.

In FIG. 33, 324 is a first adaptive filter, 325 is a first FX filter which is set to a characteristic equal to a transfer function from a loudspeaker 307 to a first error detector 317, 326 is a first coefficient updator, 327 is a second adaptive filter, 328 is a second FX filter which is set to a characteristic equal to a transfer function from a non-directional sound source 305 to a second error detector 318, and 329 is a second coefficient updator.

The output from a first adder 319 is input to an error input terminal of the first coefficient updator 326, an acoustic signal s is input to the first adaptive filter 324 and the first FX filter 325, and the output signal from the first FX filter 325 is input to a reference input terminal of the first coefficient updator 326. The first coefficient updator 326 uses an LMS (Least Mean Square) algorithm, or the like, performing a coefficient updating calculation such that the error input is always small, and updates the coefficient of the first adaptive filter 324. The output signal from the first adaptive filter 324 is output to the loudspeaker 307. Assuming that the transfer function from the loudspeaker 306 to the radiated sound detector 310 is G and the transfer function from the loudspeaker 307 to the first error detector 317 is C, and then the characteristic of the first FX filter 325 is C.

When the first coefficient updator 326 is operated to cause the first adaptive filter 324 to converge, and thus the output signal from the adder 319 approaches 0, the characteristic of the first adaptive filter 324 converges to the characteristic of −G/C. Therefore, for an acoustic signal s, a radiated sound from the loudspeaker 306 as it is received at the radiated sound detector 310 is represented as:

$$s \cdot G.$$

On the other hand, the control sound from the loudspeaker 307 as it is received at the first error detector 317 is represented as:

$$-s \cdot (-G/C) \cdot C = -s \cdot G.$$

Therefore, by arranging the positions of the radiation sound detector 310 and: the first error detector 317 so that the transfer function from the loudspeaker 306 to the radiated sound detector 310 and the transfer function from the loudspeaker 307 to the first error detector 317 are equal to each other, the radiated sound from the loudspeaker 306 and that from the loudspeaker 307 have the same sound pressure and phases that are different from each other by 180°, thus the variation in the characteristics of the loudspeakers in use is corrected and a desirable dipole characteristic can be obtained.

On the other hand, the output from a second adder 320 is input to an error input terminal of the second coefficient updator 329, an acoustic signal s is input to the second adaptive filter 327 and the second FX filter 328, and the output signal from the second FX filter 328 is input to a reference input terminal of the second coefficient updator 329. The second coefficient updator 329 uses an LMS (Least Mean Square) algorithm, or the like, performing a coefficient updating calculation such that the error input is always small, and updates the coefficient of the second adaptive filter 327. The output signal from the second adaptive filter 327 is output to the non-directional sound source 305.

Assuming that the transfer function from the non-directional sound source 305 to the second error detector 318 is D and the transfer function characteristic of the signal correction means 323 is H, the characteristic of the second FX filter 328 is D·H. When the second coefficient updator 329 is operated to cause the second adaptive filter 327 to converge, and thus the output from the second adder 320 approaches 0, the characteristic of the second adaptive filter 327 converges to a characteristic of G/(D·H).

For an acoustic signal s, a radiated sound from the loudspeaker 307 as it is received at the first error detector 317 is represented as:

$$-s \cdot G.$$

On the other hand, the control sound by the non-directional sound source 305 as it is received at the second error detector 318 is represented as:

$$s \cdot (G/(D \cdot H)) \cdot D = s \cdot G/H,$$

and the output signal from the signal correction means 323 is represented as:

$$s \cdot G/H \cdot H = s \cdot G.$$

Therefore, the output from the first error detector 317 and the output from the signal correction means 323 as they are added at the second adder 320 is represented as:

$$-s \cdot G + s \cdot G = 0.$$

Thus, a unidirectional radiation pattern can be obtained by controlling the transfer function from the loudspeaker 307 to the first error detector 317 to be equal to the transfer function from the non-directional sound source 305 to the second error detector 318, and by changing the phase of the radiated sound of the non-directional sound source 305 by 180° with respect to that of the radiated sound of the loudspeaker 307 with the amplitudes thereof being substantially the same as each other. In this case, if the acoustic radiation main axis of the unidirectional radiation pattern is directed away from the position of a passenger (e.g., the driver 304), substantially no sound from the sound source reaches directly to the passenger, thereby obtaining a desirable sound environment. Furthermore, with the above-described structure, it is possible to obtain a unidirectional radiation pattern sound source which is not influenced by a change in the operational characteristics due to aging.

Embodiment 22

Next, Embodiment 22 of the present invention will be described with reference to FIGS. 34A and 34B.

Figure 34B:
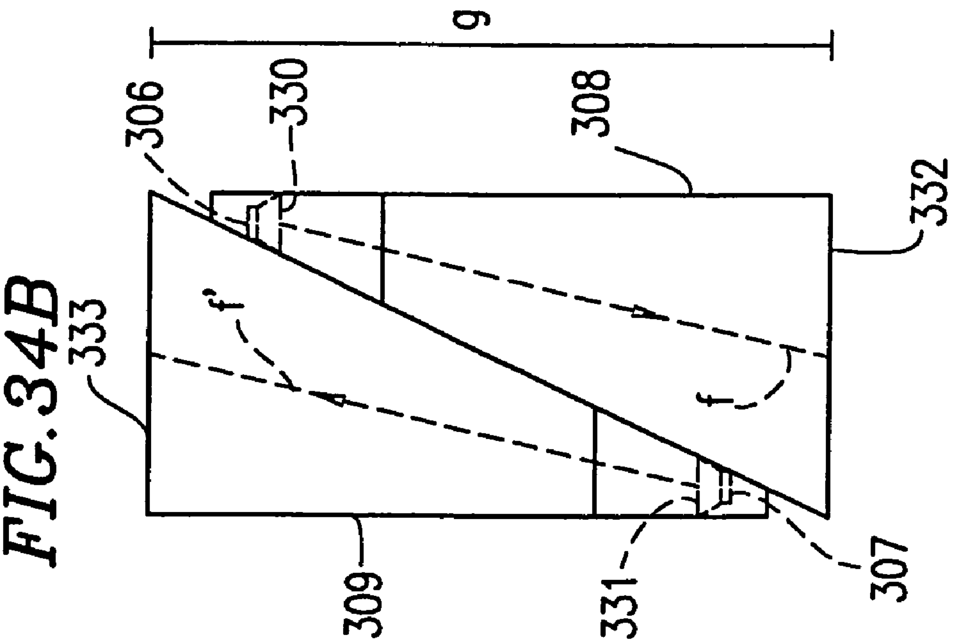
FIG. 34B is a horizontal-sectional view of an acoustic tube included in the on-vehicle amplification-sound apparatus of Embodiment 22 of the present invention.
Figure 34A:
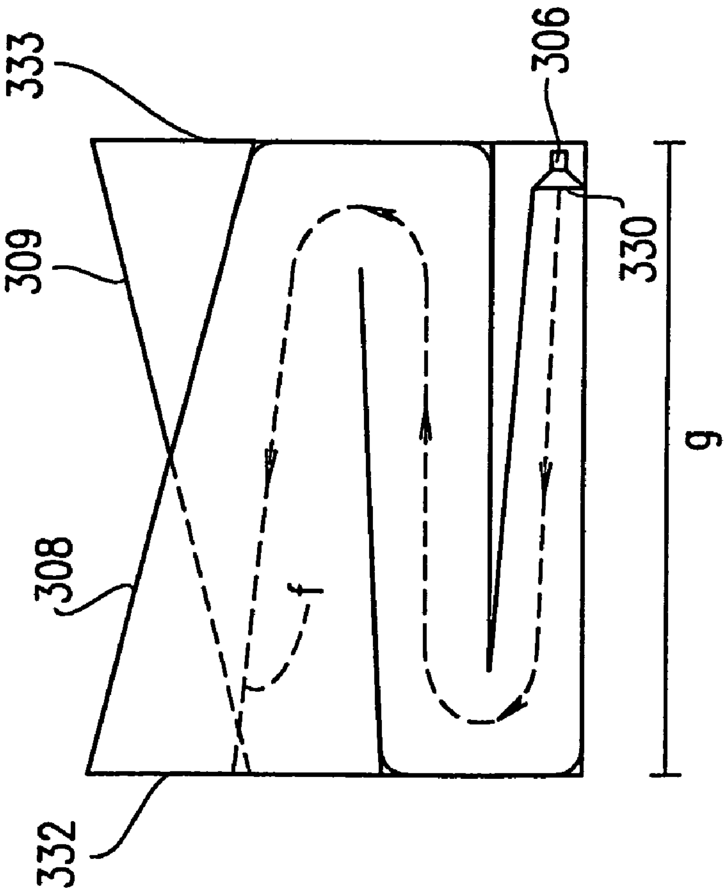
FIG. 34A is a vertical-sectional view of the acoustic tube included in an on-vehicle amplification-sound apparatus of Embodiment 22 of the present invention.

FIG. 34A is a vertical cross-sectional view of acoustic tubes 308 and 309, and FIG. 34B is a horizontal cross-sectional view thereof. In FIGS. 34A and 34B, reference numeral 330 is a diaphragm of a loudspeaker 306, 331 is a diaphragm of a loudspeaker 307, 332 is an acoustic radiation plane of the acoustic tube 308, 333 is an acoustic radiation plane of the acoustic tube 309, f is a central axis of the acoustic tube 308, f' is a central axis of the acoustic tube 309, and g is a total length of each of the acoustic tubes 308 and 309.

Each of the acoustic tubes 308 and 309 is formed of a curved sound path extending from the diaphragm 330 or 331 to the acoustic radiation plane 332 or 333, respectively. Because the acoustic tubes 308 and 309 are curved, the total length of their central axes f and f' can be long enough even if the total length g of the acoustic tubes is short. Therefore, it is possible to smoothly vary the cross-sectional area along a direction perpendicular to the sound wave traveling direction through the acoustic tubes 308 and 309 from the diaphragms 330 and 331 through the acoustic radiation planes 332 and 333, respectively. Thus, the frequency change in the acoustic impedance is reduced, thereby attaining a desirable sound pressure frequency characteristic.

Furthermore, when the acoustic tubes 308 and 309 are curved in the vertical and lateral directions, it is possible to provide the acoustic tubes 323 and 333 in a back-to-back arrangement with most of the acoustic tubes 308 and 309 overlapping each other, thereby reducing the size of the apparatus.

Embodiment 23

Embodiment 23 of the present invention will be described with reference to FIGS. 35A through 35D.

Particularly, FIGS. 35A through 35D illustrate various directional radiation patterns as obtained by a boundary element method when the interval between the acoustic radiation planes 332 and 333 as shown in FIGS. 34A and 34B, respectively, is varied to ¼, ½, ⅔, and ⅚ of the wavelength of the reproduced sound. In the figures, h is the interval between the acoustic radiation planes 332 and 333 (acoustic radiation plane interval).

Figure 35A:
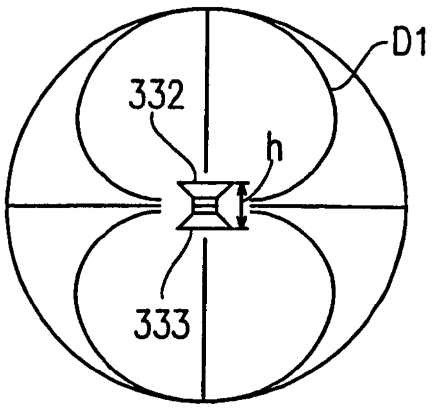
FIG. 35A is a diagram illustrating a boundary element method simulation result of a directional radiation pattern obtained when the interval between the acoustic radiation planes of two loudspeakers included in an on-vehicle amplification-sound apparatus of Embodiment 23 of the present invention is ¼ of the wavelength of the reproduced sound.
Figure 35B:
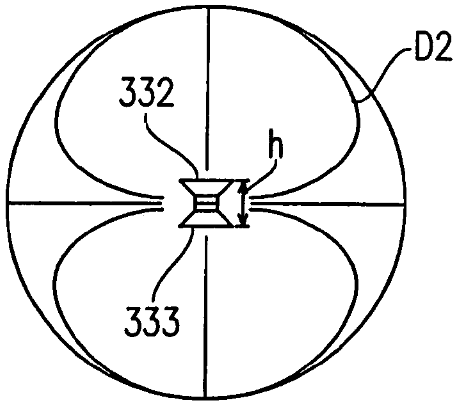
FIG. 35B a diagram illustrating a boundary element method simulation result of a directional radiation pattern obtained when the interval between the acoustic radiation planes of two loudspeakers included in an on-vehicle amplification-sound apparatus of Embodiment 23 of the present invention is ½ of the wavelength of the reproduced sound.
Figure 35C:
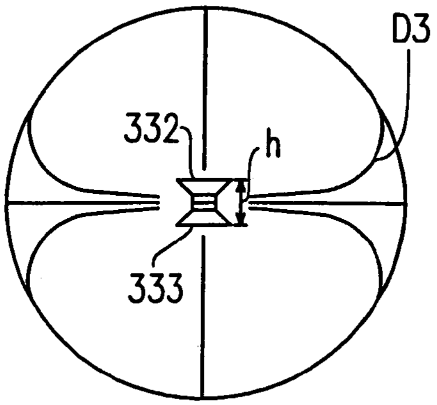
FIG. 35C a diagram illustrating a boundary element method simulation result of a directional radiation pattern obtained when the interval between the acoustic radiation planes of two loudspeakers included in an on-vehicle amplification-sound apparatus of Embodiment 23 of the present invention is ⅔ of the wavelength of the reproduced sound.
Figure 35D:
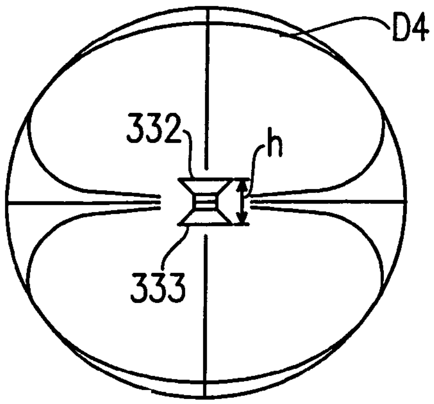
FIG. 35D a diagram illustrating a boundary element method simulation result of a directional radiation pattern obtained when the interval between the acoustic radiation planes of two loudspeakers included in an on-vehicle amplification-sound apparatus of Embodiment 23 of the present invention is ⅚ of the wavelength of the reproduced sound.

FIGS. 35C and 35D show wider directional radiation patterns than those shown in FIGS. 35A and 35B. A broad directional radiation pattern is obtained when the acoustic radiation plane interval h is greater than approximately ½ of the wavelength at the upper limit frequency in the frequency band which is desired to realized as a dipole characteristic. Accordingly, a narrow dipole directional radiation pattern can be obtained by setting the acoustic radiation plane interval h to approximately ½ or less of the wavelength at the upper limit frequency in the frequency band which is desired to be realized as a dipole characteristic.

With the on-vehicle acoustic reproducing apparatuses according to Embodiments 14 through 23 of the present invention, a desirable sound environment can be achieved in which a sufficient volume of the reproducing sound is ensured along the acoustic radiation main axis of the sound source, while the amount of sound transferred directly from the sound source is reduced in the position of a passenger such as a driver. Moreover, it is possible to obtain a desirable directional radiation pattern by improving the variation in the characteristics of the loudspeakers of the dipole sound source and the variation in the characteristics of the non-directional sound source.

Furthermore, it is understood that the effects of the above-described on-vehicle amplification-sound apparatus of the present invention can be obtained similarly with an amplification-sound apparatus having the structure as described in, for example, Embodiments 1 through 13 of the present invention.

Embodiment 24

As Embodiment 24 of the present invention, a method for controlling an amplitude of an amplification-sound apparatus will now be described with reference to FIGS. 36 to 39C. The method is performed by appropriately controlling the phase difference between the radiated sound from an amplified sound source (amplification-sound) and the radiated sound from a control sound source (control sound) in view of the wavelength at the control frequency.

Figure 36:
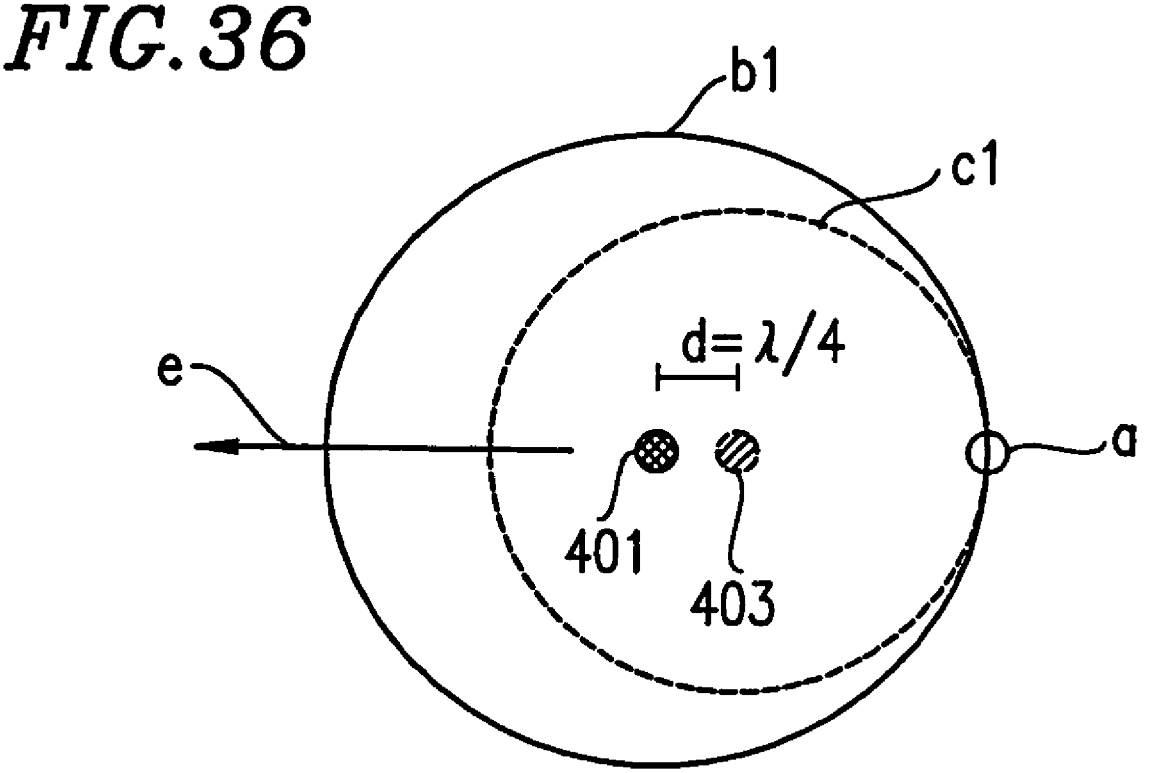
FIG. 36 is a plan view schematically illustrating extension of respective radiated sounds from an amplified sound source and a control sound source at a control frequency when the interval between the amplified sound source and the control sound source is ¼ of the wavelength λ for the control frequency.
Figure 37A:
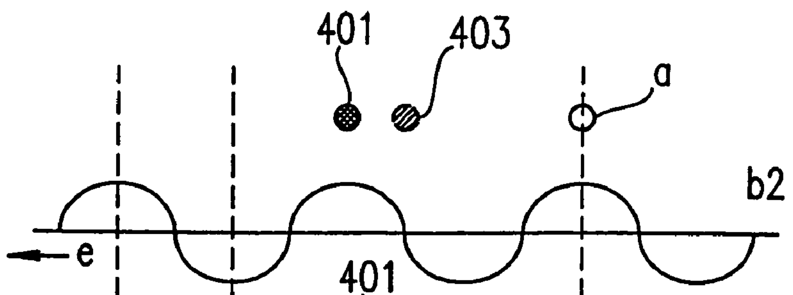
FIG. 37A is a cross-sectional view illustrating the extension of the radiated sound (amplified sound) from the amplified sound source in FIG. 36.
Figure 37B:
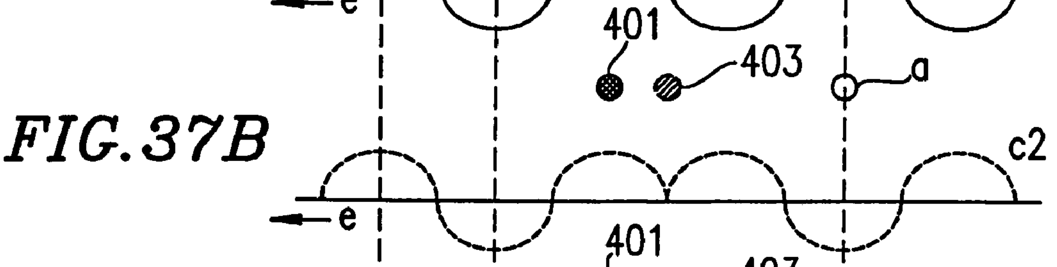
FIG. 37B is a cross-sectional view of the extension of the radiated sound (control sound) from the control sound source in FIG. 36.
Figure 37C:
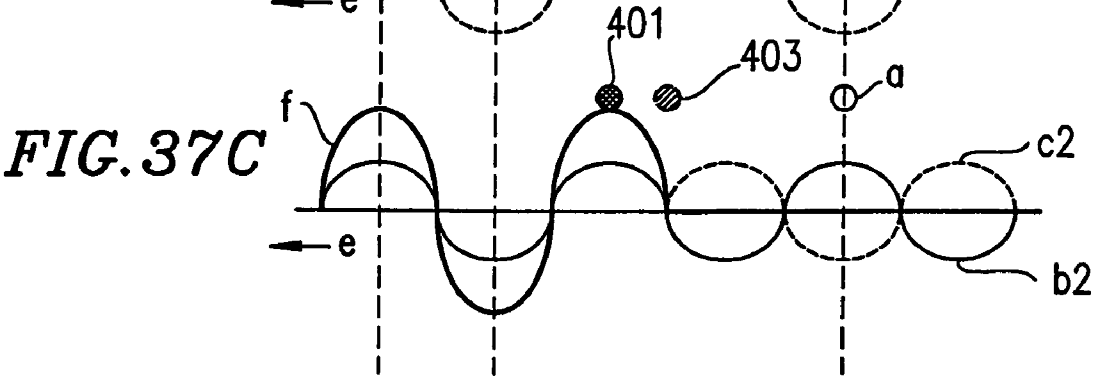
FIG. 37C is a cross-section view illustrating the obtained waveform from the interference between the amplified sound in FIG. 37A and the control sound in FIG. 37B.
Figure 38:
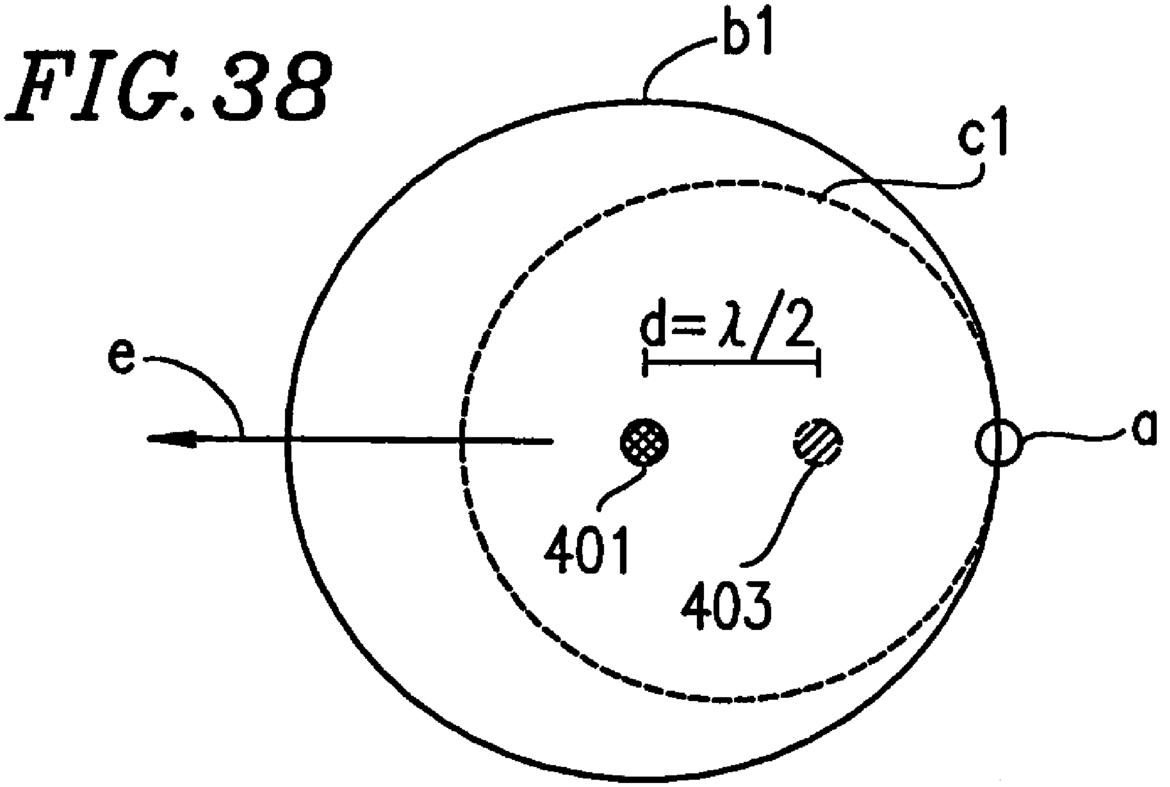
FIG. 38 is a plan view is a diagram schematically illustrating extension of respective radiated sounds from an amplified sound source and a control sound source at a control frequency when the interval between the amplified sound source and the control sound source is ½ of the wavelength λ for the control frequency.
Figures 39A, 39B, 39C:
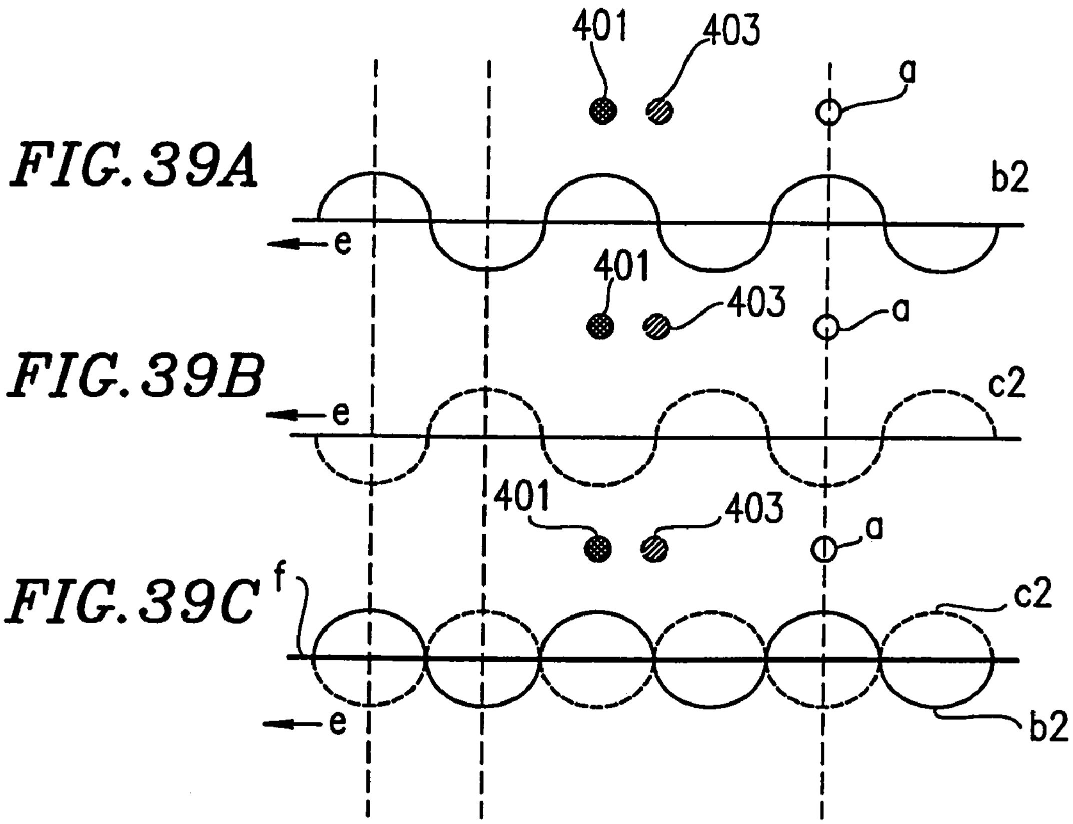
FIG. 39A is a cross-sectional view illustrating the extension of the radiated sound (amplified sound) from the amplified sound source in FIG. 38.
FIG. 39B is a cross-sectional view illustrating the extension of the radiated sound (control sound) from the control sound source in FIG. 38.
FIG. 39C is a cross-section view illustrating the obtained waveform from the interference between the amplified sound in FIG. 39A and the control sound in FIG. 39B.

Each of FIGS. 36 and 38 is a schematic diagram illustrating the planar extension of the radiated sound from each of the amplified sound source 401 and the control sound source 403 at a frequency to be controlled (control frequency). Each of FIGS. 37A to 37C and 39A to 39C is a cross-sectional view illustrating the extension of the radiated sound from each of the amplified sound source 401 and the control sound source 403 at the control frequency, while also illustrating therein the amplified sound source 401 and the control sound source 403. A point a shows a control point at which the radiated sound is controlled, and each of the figures shows a case where the control point a is set along a straight line between the amplified sound source 401 and the control sound source 403. Furthermore, FIGS. 36 and 37A to 37C show a case where an interval d between the amplified sound source 401 and the control sound source 403 is ¼ of the wavelength λ of the control frequency (i.e., d=λ/4). FIGS. 38, 39A to 39C show a case where an interval d between the amplified sound source 401 and the control sound source 403 is ½of the wavelength λ of the control frequency (i.e., d=λ/4).

In FIGS. 36 and 38, b1 is a line indicating a peak of the waveform of the amplified sound, a1 is a line indicating a dip of the waveform of the control sound, e shows a, main axis direction of the acoustic radiation. On the other hand, in FIGS. 37A to 37C and 39A to 39C, b2 is the waveform of the amplified sound, c2 is the waveform of the control sound, f is the waveform which is produced by interference between the amplified sound b2 and the control sound c2.

When the amplified sound source 401 and the control sound source 403 can be considered as point sound sources, respectively, the lines b1 and a1 are represented as shown as circles having the sound sources for their central points, respectively. The control sound is controlled so as to be interfere with, and canceled out by, the amplified sound at the control point a, and then radiated from the control sound source 403. Thus, when the waveform of the amplified sound is in its peak at the control point a, the waveform of the control sound is in its dip at the control point a. Therefore, as shown in FIGS. 36 and 38, the peak b1 of the amplified sound and the dip c1 of the control sound meet at the control point a.

As schematically illustrated in FIGS. 37A to 37C and 39A to 39C, the frequencies of the amplified sound b2 and the control sound c2 which are interfered with, and canceled out by, each other at the control point a coincide with each other. Thus, if the control sound c2 is controlled to be in its dip at control point a when the amplified sound b2 is in its peak at the control point a (see FIGS. 37A and 39A) so as to cancel out the amplified sound b2 by interference at the control point a, practically, as shown by the waveform f in FIGS. 37C and 39C, the amplified sound b2 is canceled out not only at the control point a but also at other points beyond the control point a.

When the amplified sound source 401 and the control sound source 403 can be considered as point sound sources, by setting the interval d between the sound sources to approximately ¼ (d=λ/4) of the wavelength of the control wavelength λ, it is possible to amplify the amplified sound b2 as shown by the waveform f in FIG. 37C by means of interference between the amplified sound b2 (see FIG. 37A) and the control sound a2 (see FIG. 37B) along the main axis direction of the acoustic radiation e. On the other hand, by setting the interval d between the amplified sound source 401 and the control sound source 403 to approximately ½ (d=λ/2) of the wavelength of the control wavelength λ, the amplified sound b2 is canceled out not only at the control point a but also along the main axis direction of the acoustic radiation e as shown by the waveform f in FIG. 39C by means of interference between the amplified sound b2 (see FIG. 39A) and the control sound c2 (see FIG. 39B).

Therefore, with the arrangement described above in which the interval d between the amplified sound source 401 and the control sound source 403 to approximately ¼ (d=λ/4) of the wavelength of the control wavelength λ, the amplified sound b2 can be canceled out at the control point a, while it is amplified along the main axis direction of the acoustic radiation e by interference between the amplified sound b2 and the control sound c2.

In the above description, the control point a is located along the straight line between the amplified sound source 401 and the control sound source 403. However, even when the control point a is not along such a line, if the sound source interval d is controlled in the same manner, it is also possible to cancel out the amplified sound b2 at the control point a while amplifying the amplified sound b2 along the main axis direction of the acoustic radiation e by interference between the amplified sound b2 and the control sound c2.

Even when the amplified sound source 401 and the control sound source 403 are not point sound sources, substantially, the same effects as described above can be obtained by setting the path difference of the radiation sound, from each of the sound source 401 and 403 to the control point a to approximately ¼ of the wavelength of the control frequency λ.

Further, it is possible to combine the above-described method as Embodiment 24 of the present invention with any other appropriate structure previously described in Embodiments 1 to 23.

The amplification-sound apparatus of the present invention described above is applicable to various applications in which an output of an amplified sound having a predetermined directionality is desired. Although an on-vehicle amplification-sound apparatus has been described as one particular example of an application of the present invention, the application of the present invention is of course not limited to these examples.

INDUSTRIAL APPLICABILITY

As described above, according to the amplification-sound apparatus of the present invention, a predetermined directional radiation pattern can be realized by providing a control sound source in the vicinity of the amplified sound source. When the amplified sound source and the control sound source are provided as a horn loudspeaker which includes a horn driver and an acoustic tube, an even more desirable directional radiation pattern and acoustic characteristic can be realized with respect to an externally radiated sound. If the acoustic tube is provided as a reentrant horn, a small-size amplification-sound apparatus is realized.

According to the amplification-sound apparatus of the present invention which is described as a directional loudspeaker, a sharp directional radiation pattern based on a reflector can be realized by reducing an amplified sound radiated from the back of the sound source.

Furthermore, according to the on-vehicle acoustic reproducing apparatus of the present invention which is implemented by applying an amplification-sound apparatus of the present invention to an on-vehicle use, a sufficient volume of sound is ensured in the axis direction of the acoustic radiation of the sound source, while reducing the amount of sound transferred directly from the sound source in the position of a passenger such as a driver, thereby obtaining a desirable sound environment. An excellent directional radiation pattern can be also achieved by improving the variation in the characteristics of loudspeakers of a dipole sound source and/or a non-directional sound source.

According to the present invention, the phase difference between the radiated sound from an amplified sound source (amplified-sound) and the radiated sound from a control sound source (control sound) are appropriately controlled in view of a wavelength of a control frequency, whereby an amplitude of the amplified sound can be controlled. Specifically, when the interval between the amplified sound source and the control sound source is set to approximately ¼ of the wavelength of the control wavelength, the amplified sound can be canceled out at the control point, while the amplified sound is amplified along the main axis direction of the acoustic radiation by interference between the amplified sound and the control sound.

The invention claimed is:

1. An on-vehicle sound-amplification apparatus, comprising:

a dipole sound source provided in a vicinity of a position of a passenger wherein at least one acoustic radiation axis thereof is directed outwardly from a vehicle interior; and signal processing means for amplifying an acoustic signal and then inputting an output thereof to the dipole sound source; and a non-directional sound source provided in a vicinity of a center of the dipole sound source wherein an acoustic radiation thereof is driven to have an inverted phase from that of the acoustic radiation of the dipole sound source which is directed into the vehicle interior wherein the dipole sound source includes at least two loudspeakers wherein the at least two loudspeakers are arranged so that respective acoustic radiation planes thereof are directed opposite to each other; and the signal processing means variably controls a phase of an input to at least one of the loudspeakers included in the dipole sound source, wherein the on-vehicle sound-amplification apparatus is located outside the vehicle interior, and wherein the combination of the dipole sound source, the non-directional sound source and the signal processing means produce a radiated sound where substantially no direct sound reaches a location in the vicinity of a position of a passenger.

2. An on-vehicle sound-amplification apparatus, comprising:

a dipole sound source provided in a vicinity of a position of a passenger wherein at least one acoustic radiation axis thereof is directed outwardly from a vehicle interior;

signal processing means for amplifying an acoustic signal and then inputting an output thereof to the dipole sound source; and a non-directional sound source provided in a vicinity of a center of the dipole sound source wherein an acoustic radiation thereof is driven to have an inverted phase from that of the acoustic radiation of the dipole sound source which is directed into the vehicle interior, wherein the output from the signal processing means is also input to the non-directional sound source, the on-vehicle sound-amplification apparatus located outside the vehicle interior, and the combination of the dipole sound source, the non-directional sound source and the signal processing means produce a radiated sound where substantially no direct sound reaches a location in the vicinity of a position of a passenger.

3. An on-vehicle sound-amplification apparatus according to claim 1, wherein: each of the at least two loudspeakers included in the dipole sound source has an acoustic tube whose cross-sectional area along a direction perpendicular to a sound wave traveling direction varies continuously; the acoustic tubes of the respective loudspeakers are arranged so that respective acoustic radiation planes thereof are directed opposite to each other; and a radiated sound from the loudspeaker which is driven by an output from the signal processing means is radiated by being guided along the acoustic tube.

4. An on-vehicle sound-amplification apparatus according to claim 1, the signal processing means comprising:

a radiation sound detector provided in a vicinity of a first one of the at least two loudspeakers included in the dipole sound source;

an error detector provided in a vicinity of a second one of the loudspeakers included in the dipole sound source;

an adder for adding together respective outputs from the radiated sound detector and the error detector; and calculation means for receiving the acoustic signal and the output from the adder, performing a calculation so that the output from the adder is small, and inputting the obtained result to the second loudspeaker located in the vicinity of the error detector, wherein the acoustic signal is input to the first loudspeaker located in the vicinity of the radiated sound detector.

5. An on-vehicle sound-amplification apparatus according to claim 4, the calculation means comprising:

an adaptive filter for receiving the acoustic signal;

a filter for receiving the acoustic signal; and a coefficient updator for receiving the output from the adder and an output from the filter, wherein:

an output from the adaptive filter is input to the second loudspeaker located in the vicinity of the error detector;

the coefficient updator updates a coefficient of the adaptive filter by performing a calculation so that the output from the adder is small; and the filter has a characteristic equal to a transfer function from the error detector to the second loudspeaker located in the vicinity of the error detector.

6. An on-vehicle sound-amplification apparatus according to claim 1, the signal processing means comprising:

a radiated sound detector arranged in a vicinity of a first one of the at least two loudspeakers included in the dipole sound source;

a first error detector arranged in a vicinity of a second one of the loudspeakers included in the dipole sound source;

a second error detector arranged in a vicinity of the non-directional sound source;

signal correction means for receiving an output from the second error detector;

a first adder for adding together an output from the radiation sound detector and an output from the first error detector;

a second adder for adding together the output from the first error detector and an output from the signal correction means;

first calculation means for receiving the acoustic signal and an output signal from the first adder, and performing a calculation so that the output signal from the first adder is small, wherein an output therefrom is input to the second loudspeaker located in the vicinity of the first error detector; and second calculation means for receiving the acoustic signal and an output signal from the second adder, and performing a calculation so that the output signal from the second adder is small, wherein an output therefrom is input to the non-directional sound source, wherein the acoustic signal is input to the first loudspeaker located in the vicinity of the radiation sound detector.

7. An on-vehicle sound-amplification apparatus according to claim 6, the first calculation means comprising:

a first adaptive filter for receiving the acoustic signal;

a first filter for receiving the acoustic signal; and a first coefficient updator for receiving the output from the first adder and an output from the first filter, wherein:

an output from the first adaptive filter is input to the second loudspeaker located in the vicinity of the first error detector;

the first coefficient updator updates a coefficient of the first adaptive filter by performing a calculation so that the output from the first adder is small; and the first filter has a characteristic equal to a transfer function from the first error detector to the second loudspeaker located in the vicinity of the first error detector, the second calculation means comprising:

a second adaptive filter for receiving the acoustic signal;

a second filter for receiving the acoustic signal; and a second coefficient updator for receiving the output from the second adder and an output from the second filter, wherein:

an output from the second adaptive filter is input to the non-directional sound source;

the second coefficient updator updates a coefficient of the second adaptive filter by performing a calculation so that the output from the second adder is small; and the second filter has a characteristic equal to a transfer function from the second error detector to the non-directional sound source.

8. An on-vehicle sound-amplification apparatus according to claim 3, wherein the acoustic tube of each of the at least two loudspeakers included in the dipole sound source is formed of a sound path having a bent shape.

9. An on-vehicle sound-amplification apparatus according to claim 8, wherein the at least two loudspeakers included in the dipole sound source are arranged so that an interval between the respective acoustic radiation planes included in the acoustic tubes of the loudspeakers is less than or equal to approximately ½ of the wavelength of the reproduced sound.

10. An on-vehicle sound-amplification apparatus according to claim 1, the dipole sound source comprising an amplified sound source for radiating an amplified sound and a control sound source for radiating a control sound, wherein an acoustic radiation plane of the amplification-sound source and an acoustic radiation plane of the control sound source are placed such that a difference between a phase of the amplified sound and a phase of the control sound at a desired frequency is substantially within 90° in a direction along a main axis of acoustic radiation of the amplified sound.

* * * * *